United States Patent
Maruyama et al.

(10) Patent No.: US 6,430,272 B1
(45) Date of Patent: *Aug. 6, 2002

(54) MESSAGE SWITCHING APPARATUS FOR PROCESSING MESSAGE ACCORDING TO MESSAGE PROCESSING PROCEDURE

(75) Inventors: Tomoaki Maruyama, Yokohama; Yasuki Iizuka, Fujisawa, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,150

(22) Filed: Apr. 30, 1998

(30) Foreign Application Priority Data

Oct. 3, 1997 (JP) .............................................. 9-270927

(51) Int. Cl.[7] ................................................ H04M 1/64
(52) U.S. Cl. ..................... 379/88.22; 379/67.1; 379/76; 379/88.04; 379/88.12; 379/88.15; 379/88.18; 379/88.19
(58) Field of Search ...................... 379/67.1, 69, 88.01, 379/88.02, 88.04, 88.13, 88.14, 88.17, 88.18, 88.22, 88.25, 88.26, 900, 905, 907, 908, 71, 76, 88.08, 88.11, 88.12, 88.15, 88.19, 88.2, 88.21, 88.23, 88.24

(56) References Cited

U.S. PATENT DOCUMENTS

| | | | |
|---|---|---|---|
| 4,757,525 A | * | 7/1988 | Matthews et al. ....... 379/88.13 |
| 5,193,110 A | | 3/1993 | Jones et al. .............. 379/93.14 |
| 5,394,445 A | * | 2/1995 | Ball et al. .................. 379/67.1 |
| 5,608,786 A | * | 3/1997 | Gordon ....................... 379/100 |
| 5,644,629 A | * | 7/1997 | Chow .......................... 379/142 |
| 5,675,507 A | * | 10/1997 | Bobo, II .................. 364/514 R |
| 5,742,668 A | * | 4/1998 | Pepe et al. ..................... 379/58 |
| 5,870,549 A | * | 2/1999 | Bobo, II ................. 395/200.36 |
| 5,892,909 A | * | 4/1999 | Grasso et al. .......... 395/200.31 |

* cited by examiner

Primary Examiner—Allan Hoosain
(74) Attorney, Agent, or Firm—Lowe Hauptman Gilman & Berner, LLP

(57) ABSTRACT

A plurality of motive-procedure sets respectively composed of a motive, a condition and a procedure of a message processing edited according to user's intention are stored in advance for each user. When a message sent for a receiver is received in a message switching apparatus, it is judged whether or not one of the motives corresponding to a plurality of motive-procedure sets for the receiver is fired. When a particular motive is fired, a particular message processing of a particular motive-procedure set corresponding to the particular motive is performed in cases where a particular condition of the particular motive-procedure set is satisfied, so that an incoming call of the message is notified to the receiver or the message is transmitted or forwarded to the receiver according to the particular message processing. Accordingly, even though a user does not have a knowledge of a computer or a message processing apparatus, any message sent for the user can be automatically processed in the message processing apparatus according to user's intention.

46 Claims, 23 Drawing Sheets

FROM : USER U2
TO : USER U1
SUBJECT : (URGENT COMMUNICATION)
THE CHANGE OF THE
MEETING

A STARTING TIME OF THE MEETING
IS CHANGED TO 8:00 TOMORROW.
  SINCERELY,
    T. NISHINOMIYA

FROM : USER U100
TO : USER U1
SUBJECT : BIG BUSINESS

YOU'LL BECOME A BILLIONAIRE
BY SELLING THIS DETERGENT.
I WAIT FOR YOUR REPLY.

CONTACT NUMBER : 03-1234-5678
    SINCERELY,
      T. MARUYAMA

FIG. 7

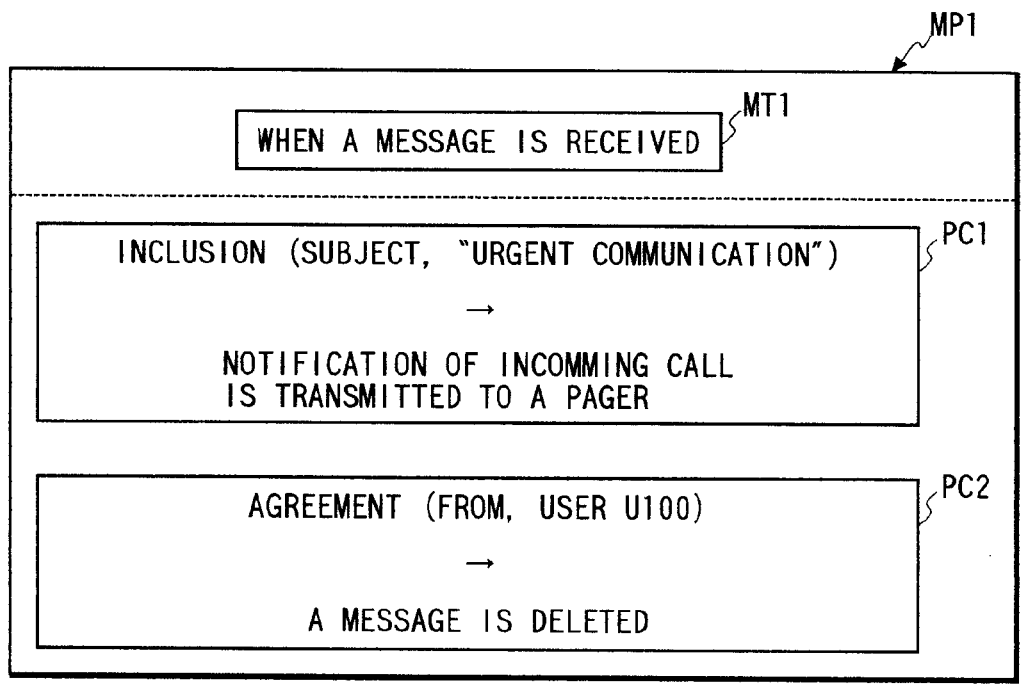

MP1

MT1: WHEN A MESSAGE IS RECEIVED

PC1: INCLUSION (SUBJECT, "URGENT COMMUNICATION")
→
NOTIFICATION OF INCOMMING CALL
IS TRANSMITTED TO A PAGER

PC2: AGREEMENT (FROM, USER U100)
→
A MESSAGE IS DELETED

FIG. 9

| NAME OF MOTIVE | SUBSTANCE OF MOTIVE |
|---|---|
| WHEN A MESSAGE IS RECEIVED | WHEN A MESSAGE IS RECEIVED |
| AT 0 O'CLOCK EVERY NIGHT | AT 0 O'CLOCK EVERY NIGHT |
| WHEN A MESSAGE VOLUME EXCEEDS A DATA BASE CAPACITY | WHEN A MESSAGE VOLUME EXCEEDS A DATA BASE CAPACITY |
| ⋮ | ⋮ |

FIG. 10

| NAME | LANGUAGE EXPRESSION | THE NUMBER OF ARGUMENTS | ARGUMENT | TYPE | SUBSTANCE |
|---|---|---|---|---|---|
| AGREEMENT | $1 AGREES WITH $2 | 2 | FIRST | ENUMERATION (SUBJECT, FROM) | AGREEMENT ($1, $2) |
| | | | SECOND | CHARACTER STRING | |
| INCLUSION | $1 INCLUDES $2 | 2 | FIRST | ENUMERATION (SUBJECT, FROM) | INCLUSION ($1, $2) |
| | | | SECOND | CHARACTER STRING | |
| ⋮ | ⋮ | ⋮ | ⋮ | ⋮ | ⋮ |

FIG. 11

| NAME | LANGUAGE EXPRESSION | THE NUMBER OF ARGUMENTS | | ARGUMENT TYPE | SUBSTANCE |
|---|---|---|---|---|---|
| TRANSMISSION | A MESSAGE IS TRANSMITTED TO $1 | 1 | FIRST | ENUMERATION (HOME TELEPHONE, PORTABLE TELEPHONE, FACSIMILE, AND ELECTRONIC MAIL) | TRANSMISSION ($1) |
| NOTIFICATION | THE INCOMING OF A MESSAGE IS NOTIFIED TO $1 | 1 | FIRST | ENUMERATION (PAGER, HOME TELEPHONE, PORTABLE TELEPHONE, FACSIMILE, AND ELECTRONIC MAIL) | NOTIFICATION ($1) |
| FORWARDING | A MESSAGE IS FORWARDED TO $1 | 1 | FIRST | ENUMERATION (HOME TELEPHONE, PORTABLE TELEPHONE, FACSIMILE, AND ELECTRONIC MAIL) | FORWARDING ($1) |
| DELETION | A MESSAGE IS DELETED | 0 | | | DELETION ( ) |

FIG. 21

| | | LINE |
|---|---|---|
| (SYSTEM) | WHAT IS A MOTIVE ? | 1 |
| (USER) | WHEN A MESSAGE IS RECEIVED | 2 |
| (SYSTEM) | WHEN A MESSAGE IS RECEIVED ? | 3 |
| (USER) | YES | 4 |
| (SYSTEM) | WHAT IS A CONDITION ? | 5 |
| (USER) | INCLUSION | 6 |
| (SYSTEM) | INCLUSION ? | 7 |
| (USER) | YES | 8 |
| (SYSTEM) | INCLUSION IS THAT A FIRST ARGUMENT INCLUDES A SECOND ARGUMENT | 9 |
| (USER) | SUBJECT | 10 |
| (SYSTEM) | SUBJECT ? | 11 |
| (USER) | YES | 12 |
| (SYSTEM) | WHAT IS THA SECOND ARGUMENT ? | 13 |
| (USER) | URGENT COMMUNICATION | 14 |
| (SYSTEM) | URGENT COMMUNICATION ? | 15 |
| (USER) | YES | 16 |
| (SYSTEM) | WHAT IS A MESSAGE PROCESSING PROCEDURE ? | 17 |
| (USER) | NOTIFICATION | 18 |
| (SYSTEM) | NOTIFICATION ? | 19 |
| (USER) | YES | 20 |
| (SYSTEM) | NOTIFICATION IS THAT THE INCOMING OF A MESSAGE IS NOTIFIED TO A FIRST ARGUMENT, WHAT IS THE FIRST ARGUMENT ? | 21 |
| (USER) | PAGER | 22 |
| (SYSTEM) | PAGER ? | 23 |
| (USER) | YES | 24 |
| (SYSTEM) | DOES A MOTIVE-PROCEDURE SET "WHEN A MESSAGE IS RECEIVED, IF A SUBJECT INCLUDES URGENT COMMUNICATION, THE INCOMING OF A MESSAGE IS NOTIFIED TO PAGER" EDIT ? | 25 |
| (USER) | YES | 26 |
| (SYSTEM) | THE EDTION OF THE MOTIVE-PROCEDURE SET IS COMPLETED | 27 |

FIG. 22

| | | LINE |
|---|---|---|
| (SYSTEM) | INCLUSION IS THAT A FIRST ARGUMENT INCLUDES A SECOND ARGUMENT, WHAT IS THE FIRST ARGUMENT ? PLEASE SELECT THE FIRST ARGUMENT FROM SUBJECT AND FROM. | 9 |

FIG. 23

| | | LINE |
|---|---|---|
| (SYSTEM) | WHAT IS THE SECOND ARGUMENT ? | 13 |
| (USER) | URGENT COMMUNICATION | 14 |
| (SYSTEM) | "URGENT COMMUNICATION" (EXPRESSED BY KATAKANA) | 15 |
| (USER) | YES | 16 |
| (SYSTEM) | CONVERSION OF KATAKANA-CHINESE CHARACTER ? | 16-1 |
| (USER) | YES | 16-2 |
| (SYSTEM) | WHAT IS A MESSAGE PROCESSING PROCEDURE ? | 17 |
| (USER) | NOTIFICATION | 18 |

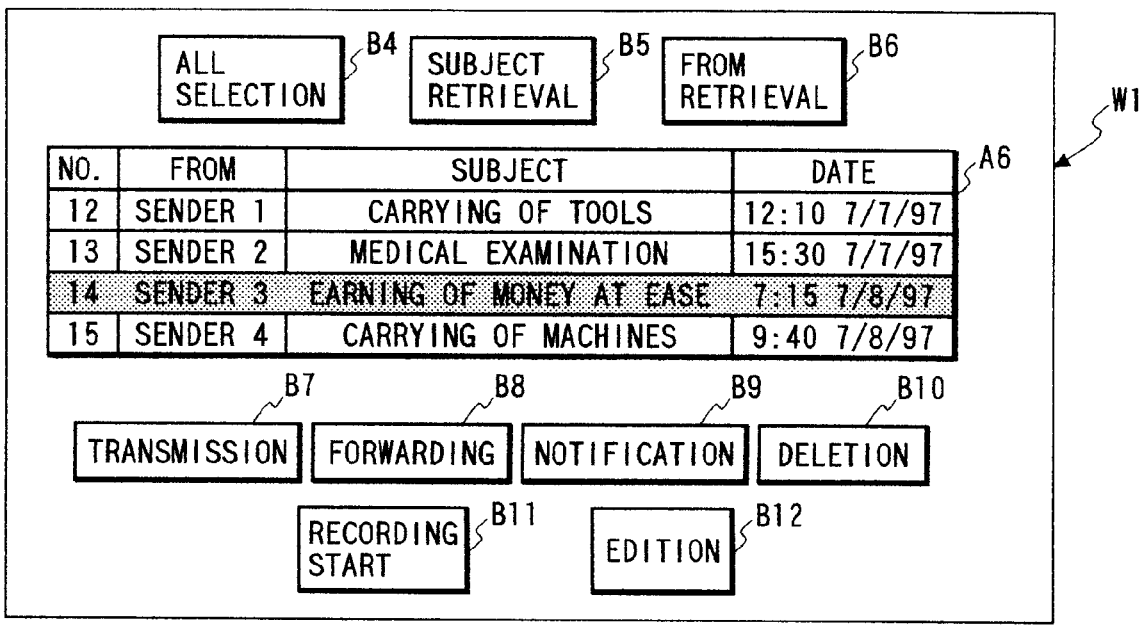

FIG. 36

| NO. | FREQUENCY | TYPE | CONTENTS |
|---|---|---|---|
| 1 | 5 | CONDITION | INCLUSION (FROM, "SENDER 3") |
| | | FREQUENCY | DELETION ( ) |
| 2 | 1 | CONDITION | INCLUSION (SUBJECT, "INFORMATION") |
| | | CONDITION | INCLUSION (TO, "DEVELOPMENT SECTION") |
| 3 | 2 | PROCESSING | FORWARDING (FAX) |
| | | CONDITION | INCLUSION (FROM, "SENDER 1") |
| | | PROCESSING | DELETION ( ) |

MESSAGE SWITCHING APPARATUS FOR PROCESSING MESSAGE ACCORDING TO MESSAGE PROCESSING PROCEDURE

BACKGROUND OF THE INVENTION

1. Field of the Invention

The present invention relates to a message switching apparatus such as a public telephone network, an electronic mail switching system, a computer telephony system or a facsimile accumulation switching system in which various message processing procedures such as the delivery of a message, the forwarding of a message, the deletion of a message and the conversion of a data format of a message are set.

2. Description of the Related Art

2.1. PREVIOUSLY PROPOSED ART

An internet has been explosively used in companies, homes and schools, and the transmission of electronic mails has been rapidly performed. Also, communication terminals such as a pager (called a pocket bell in Japan), a portable telephone and a personal digital assistant and information terminals such as a personal computer have been developed with the electronic mail. In addition, because the communication terminals and the information terminals have been developed with a message system such as an electronic mail, a message switching system unifying various message systems, the communication terminals and the information terminals has been paid attention. In the message switching system, an electronic mail of a text format is converted into a voice and is transmitted to a telephone, a notification of the incoming of an electronic mail is output to a pager of a mail receiver, and image information transmitted from a facsimile is transmitted in a form of a multimedia electronic mail.

A message switching in this message switching system develops from a message switching among information terminals and communication terminals which are formed of the same type and are operated at the same protocol to a message switching called a unified messaging for performing the message switching among various information terminals and communication terminals at various protocols.

In the circumstance of this unified messaging, a high function of an automatic transmission or notification is added to an old message function. Also, the number of messages to be processed in the message switching system (or the number of messages transmitted or received by a user) tends to rapidly increase.

In these circumstances of the heightening of the function and the increase of the number of messages, to select information useful for each user himself and to quickly read a message if required, in addition to the requirement of a high functional message processing tool such as a message selection function or a message notification function for the message switching system, it is important that a user can easily use the high functional message processing tool.

To achieve the simple use of the high functional message processing tool, for example, various software tools such as a software program "MH", a software program "Mailagent" and a software program "Elm" have been developed to perform an intellectual processing of an electronic message in a UNIX type work station.

2.2. PROBLEMS TO BE SOLVED BY THE INVENTION

However, though functions of various high functional message processing tools are all different from each other, when a user desires to set one high functional message processing tool to be operated according to a user's intention, the user is required to have a high-grade knowledge for the software tool. Therefore, it is difficult for many users having no knowledge about the programming and no knowledge of computers to use the high functional message processing tool. For example, in cases where the user uses the software program "Mailagent", it is required of the user to set a setting file of a sentence structure similar to a command "awk" of the UNIX, so that it is required of the user, for example, to have a knowledge relating to a regular expression of a character string and a knowledge of RFC822 denoting an agreement of an internet.

To achieve a purpose that a user not having a knowledge of computers so much can use any high functional message processing tool, a system designer assumes a user's typical use method, and a message processing according to the use method is only provided for the user. Therefore, though the user can easily use any high functional message processing tool, the use of the high functional message processing tool is restricted to the message processing according to the use method, the use of the high functional message processing tool suitable for circumstances of each user is impossible.

SUMMARY OF THE INVENTION

An object of the present invention is to provide, with due consideration to the drawbacks of such a conventional message switching apparatus, a message switching apparatus in which a plurality of message processing procedures suitable for circumstances of each user are easily set and a user not having a knowledge of a computer so much uses any high functional message processing tool according to one message processing procedure suitable for circumstances of the user.

The object is achieved by the provision of a message switching apparatus, comprising:

message receiving means for receiving a particular message and a destination address of a receiver of the particular message from a sender operating a sender's communication terminal or information terminal;

motive-procedure set storing means for storing a plurality of motive-procedure sets, each motive-procedure set being composed of a motive and a message processing procedure with condition, the motive being expressed by an event, the event determining a start of an operation of one message processing procedure with condition corresponding to the motive, the occurrence of the event being expressed by the firing of the motive, the message processing procedure with condition being composed of both a message processing procedure and a condition of the performance of the message processing procedure, the condition being expressed by a predicate logical equation, and the message processing procedure indicating a procedure of a processing performed for a message;

motive firing judging means for identifying the receiver according to the particular message received by the message receiving means, retrieving a plurality of specific motive-procedure sets corresponding to the receiver from the motive-procedure set storing means, identifying a plurality of specific motives corresponding to the specific motive-procedure sets, detecting the occurrence of a particular event expressing a particular motive among the specific motives, selecting a particular motive-procedure set corresponding to the particular motive from the plurality of specific motive-procedure sets, and judging the firing of the particular motive;

message processing procedure performing means for performing a particular message processing procedure with condition of the particular motive-procedure set in cases where it is judged by the motive firing judging means that the particular motive is fired and a particular condition of the particular message processing procedure with condition is satisfied; and message transmitting means for receiving the particular message and the destination address of the receiver from the message receiving means, transmitting the particular message to a receiver's communication terminal or information terminal indicated by the destination address of the receiver in cases where a particular message processing performed by the message processing procedure performing means indicates the transmission of the particular message to the receiver.

In the above configuration, a plurality of motive-procedure sets are stored in advance in the motive-procedure set storing means for each user representing a receiver or a sender. Each motive-procedure set is composed of a motive and a message processing procedure with condition, the motive is expressed by an event determining a start of an operation of one message processing procedure with condition corresponding to the motive. The occurrence of the event is called the firing of the motive. The message processing procedure with condition is composed of both a message processing procedure and a condition of the performance of the message processing procedure. The condition is expressed by a predicate logical equation, and the message processing procedure indicates a procedure of a processing performed for a message.

When one of the users desires to send a particular message as a sender to another user denoting a receiver, the sender prepares contents of the particular message and adds a destination address of the receiver to the particular message as transmission information, and the sender transmits the particular message to the message receiving means. In the message receiving means, a destination address of a receiver is analyzed, and the analyzed result is transmitted to the motive firing judging means to determine how the particular message is processed.

In the motive firing judging means, a plurality of specific motive-procedure sets corresponding to the receiver are retrieved from the motive-procedure set storing means, and a plurality of specific motives corresponding to the specific motive-procedure sets are identified. Thereafter, when a particular event expressing a particular motive included in the specific motives occurs, the firing of the particular motive is judged, and a particular motive-procedure set corresponding to the particular motive is selected from the specific motive-procedure sets and is transmitted to the message processing procedure performing means.

In the message processing procedure performing means, it is judged whether or not a particular condition corresponding to the particular motive-procedure set is satisfied. In cases where the particular condition is satisfied, a particular message processing procedure corresponding to the particular motive-procedure set is performed. In cases where a particular message processing of the particular message processing procedure indicates the transmission of the particular message to the receiver, the particular message is transmitted from the message transmitting means to a receiver's communication terminal or information terminal indicated by the destination address of the receiver.

Accordingly, a plurality of message processing procedures suitable for circumstances of each user can be easily set in the motive-procedure set storing means, and a user not having a knowledge of a computer so much can use any high functional message processing tool according to one message processing procedure suitable for circumstances of the user.

It is preferred that the message switching apparatus further comprise:

motive table storing means for storing a plurality of motives;

condition table storing means for storing a plurality of conditions;

message processing procedure table storing means for storing a plurality of message processing procedures; and motive-procedure set editing means for controlling an information terminal operated by a user to graphically display the motives stored in the motive table storing means on an image screen of the information terminal, instructing the user to select a desired motive from among the motives according to an intention of the user, controlling the information terminal to graphically display the conditions stored in the condition table storing means on the image screen of the information terminal, instructing the user to select a desired condition from among the conditions according to the intention of the user, controlling the information terminal to graphically display the message processing procedures stored in the message processing procedure table storing means on the image screen of the information terminal, instructing the user to select a desired message processing procedure from among the message processing procedures according to the intention of the user, editing a desired motive-procedure set by combining the desired motive, the desired condition and the desired message processing procedure selected by the user, storing the desired motive-procedure set corresponding to the user in the motive-procedure set storing means in cases where the user desires to process any message sent for the user according to the desired motive-procedure set, and deleting the desired motive-procedure set corresponding to the user from the motive-procedure set storing means in cases where the user desires to delete the desired motive-procedure set.

In the above configuration, the motives stored in the motive table storing means, the conditions stored in the condition table storing means and the message processing procedures stored in the message processing procedure table storing means are graphically displayed on an image screen of an information terminal operated by the user under the control of the motive-procedure set editing means, the user selects a desired motive, a desired condition and a desired message processing procedure, and a desired motive-procedure set is automatically edited according to the desired motive, the desired condition and the desired message processing procedure.

Thereafter, in cases where the user desires to process any message sent for the user according to the desired motive-procedure set, the desired motive-procedure set is stored in the motive-procedure set storing means. In contrast, in cases where the user desires to delete the desired motive-procedure set from the motive-procedure set storing means, the desired motive-procedure set is deleted from the motive-procedure set storing means.

Accordingly, even though a user does not have a knowledge of a computer or a knowledge of a message switching apparatus so much, any desired motive-procedure set possible to be prepared in the message switching apparatus can be automatically edited. Therefore, the user can automatically process any message sent for the user according to the desired motive-procedure set in cases where the user desires the processing of the message according to the desired motive-procedure set, and the user can cancel the processing of a message sent for the user according to the desired motive-procedure set in cases where the user desires not to process the message according to the desired motive-procedure set.

It is also preferred that the message switching apparatus further comprise:

voice recognizing means for recognizing a user's voice and converting the user's voice into a natural language character string; and motive-procedure set editing means for giving a voiced guidance to a user operating a communication terminal or an information terminal, receiving a voiced instruction of the user produced in reply to the voiced guidance, transmitting the voiced instruction of the user to the voice recognizing means to obtain a particular natural language character string corresponding to the voiced instruction of the user from the voice recognizing means, editing a user's motive-procedure set corresponding to the user according to the particular natural language character string, storing the user's motive-procedure set corresponding to the user in the motive-procedure set storing means in cases where the editing of the user's motive-procedure set denotes a new preparation, and deleting the user's motive-procedure set corresponding to the user from the motive-procedure set storing means in cases where the editing of the user's motive-procedure set denotes a deletion.

Accordingly, because the user can operates his communication terminal or information terminal by his voice in reply to the voiced guidance, even though the user does not have a knowledge of a computer or a knowledge of a message switching apparatus so much, any desired motive-procedure set possible to be prepared in the message switching apparatus can be automatically edited. Therefore, the user can automatically process any message sent for the user according to the desired motive-procedure set in cases where the user desires the processing of the message according to the desired motive-procedure set, and the user can cancel the processing of a message sent for the user according to the desired motive-procedure set in cases where the user desires not to process the message according to the desired motive-procedure set.

It is also preferred that the message switching apparatus further comprise:

message managing means for controlling an information terminal operated by a user to graphically display a plurality of messages sent for the user and a plurality of condition candidates for a desired condition on an image screen of the information terminal, receiving the desired condition selected by the user from the condition candidates, selecting a specific message from the messages according to the desired condition, controlling the information terminal to graphically display a plurality of procedure candidates for a desired message processing procedure on the image screen of the information terminal, processing the specific message according to the desired message processing procedure selected by the user from the procedure candidates, controlling the information terminal to graphically display a plurality of motive candidates for a desired motive on the image screen of the information terminal, preparing a desired motive-procedure set from the desired condition, the desired message processing procedure and the desired motive selected by the user, and storing the desired motive-procedure set in the motive-procedure set storing means.

In the above configuration, when the user selects a specific message from a plurality of messages sent for the user and process the specific message according to user's intention, the messages are graphically displayed, a desired condition is selected by the user from a plurality of condition candidates graphically displayed, and a desired message processing procedure is selected by the user from a plurality of message processing procedure candidates graphically displayed. Thereafter, a desired motive is selected by the user from a plurality of motive candidates graphically displayed, and a desired motive-procedure set is prepared from the desired condition, the desired message processing procedure and the desired motive and is stored in the motive-procedure set storing means.

Accordingly, because a plurality of condition candidates graphically displayed, a plurality of message processing procedure candidates and a plurality of motive candidates are graphically displayed, even though the user does not have a knowledge of a computer or a knowledge of a message switching apparatus so much, the user can select and process the specific message, and the user can automatically process any message sent for the user by the desired motive-procedure set according to the user's intention.

Also, because the desired condition and the desired message processing procedure are prepared when the specific message is selected and processed, the desired motive-procedure set can be efficiently prepared.

It is also preferred that the message switching apparatus further comprise:

message managing means for repeatedly performing a managing operation in which an information terminal operated by a user is controlled to graphically display a plurality of messages sent for the user and a plurality of condition candidates for a desired condition on an image screen of the information terminal, the desired condition selected by the user from the condition candidates is received, a specific message is selected from the messages according to the desired condition, the information terminal is controlled to graphically display a plurality of procedure candidates for a desired message processing procedure on the image screen of the information terminal, the specific message is processed according to the desired message processing procedure selected by the user from the procedure candidates and a desired message processing procedure with condition is prepared from the desired condition and the desired message processing procedure, controlling the information terminal to graphically display a plurality of motive candidates for a desired motive on the image screen of the information terminal in cases where the frequency of the managing operations performed to prepare the desired message processing procedure with condition exceeds a frequency threshold value, preparing a desired motive-procedure set from the desired condition, the desired message processing procedure and the desired motive selected by the user, and storing the desired motive-procedure set in the motive-procedure set storing means.

In the above configuration, a managing operation is performed to process a specific message selected from a plurality of messages and prepare a desired message processing procedure with condition, and the frequency of managing operations performed for the same desired message processing procedure with condition is counted. In cases where the frequency of the managing operations performed to prepare the desired message processing procedure with condition exceeds a frequency threshold value, the desired message processing procedure with condition strongly reflects a user's intention for messages sent for the user. Therefore, a desired motive-procedure set is prepared from the desired message processing procedure with condition and a desired motive and is stored in the motive-procedure set storing means.

Accordingly, because the desired message processing procedure with condition strongly reflecting a user's intention for messages sent for the user is specified and a desired motive-procedure set strongly reflecting the user's intention is stored in the motive-procedure set storing means, any message sent for the user can be processed by the desired motive-procedure set according to the user's strong intention.

Also, because a plurality of condition candidates graphically displayed, a plurality of message processing procedure candidates and a plurality of motive candidates are graphically displayed, even though the user does not have a knowledge of a computer or a knowledge of a message switching apparatus so much, the user can select and process the specific message.

BRIEF DESCRIPTION OF THE DRAWINGS

The objects, features and advantages of the present invention will be apparent from the following description taken in conjunction with the accompanying drawings, in which:

FIG. 6A shows a first message M1 transmitted to the message switching apparatus shown in FIG. 1;

FIG. 6B shows a second message M2 transmitted to the message switching apparatus shown in FIG. 1;

FIG. 7 shows an example of a motive-procedure set;

FIG. 9 shows a plurality of motive elements stored in a motive table storing unit shown in FIG. 8;

FIG. 10 shows a plurality of condition elements stored in a condition table storing unit shown in FIG. 8;

FIG. 11 shows a plurality of message processing procedure elements stored in a message processing procedure table storing shown in FIG. 8;

FIG. 21 shows an example of a voice communication between the message switching apparatus shown in FIG. 20 and a user;

FIG. 22 shows an example of another voice communication performed for the setting of a first argument of a condition;

FIG. 23 shows an example of another voice communication performed for the conversion of a character expression type;

FIG. 29 shows a message operating window in which a reversing display is performed for one message selected by a user;

FIG. 30 shows an example of a condition recorded in a management recording unit shown in FIG. 24;

FIG. 31 shows an example of a condition and a message processing procedure recorded in a management recording unit shown in FIG. 24;

FIG. 36 shows an example of a table of a plurality of message processing procedures with conditions and frequencies recorded in a management recording unit shown in FIG. 34;

DETAILED DESCRIPTION OF THE EMBODIMENTS

Figure 1:
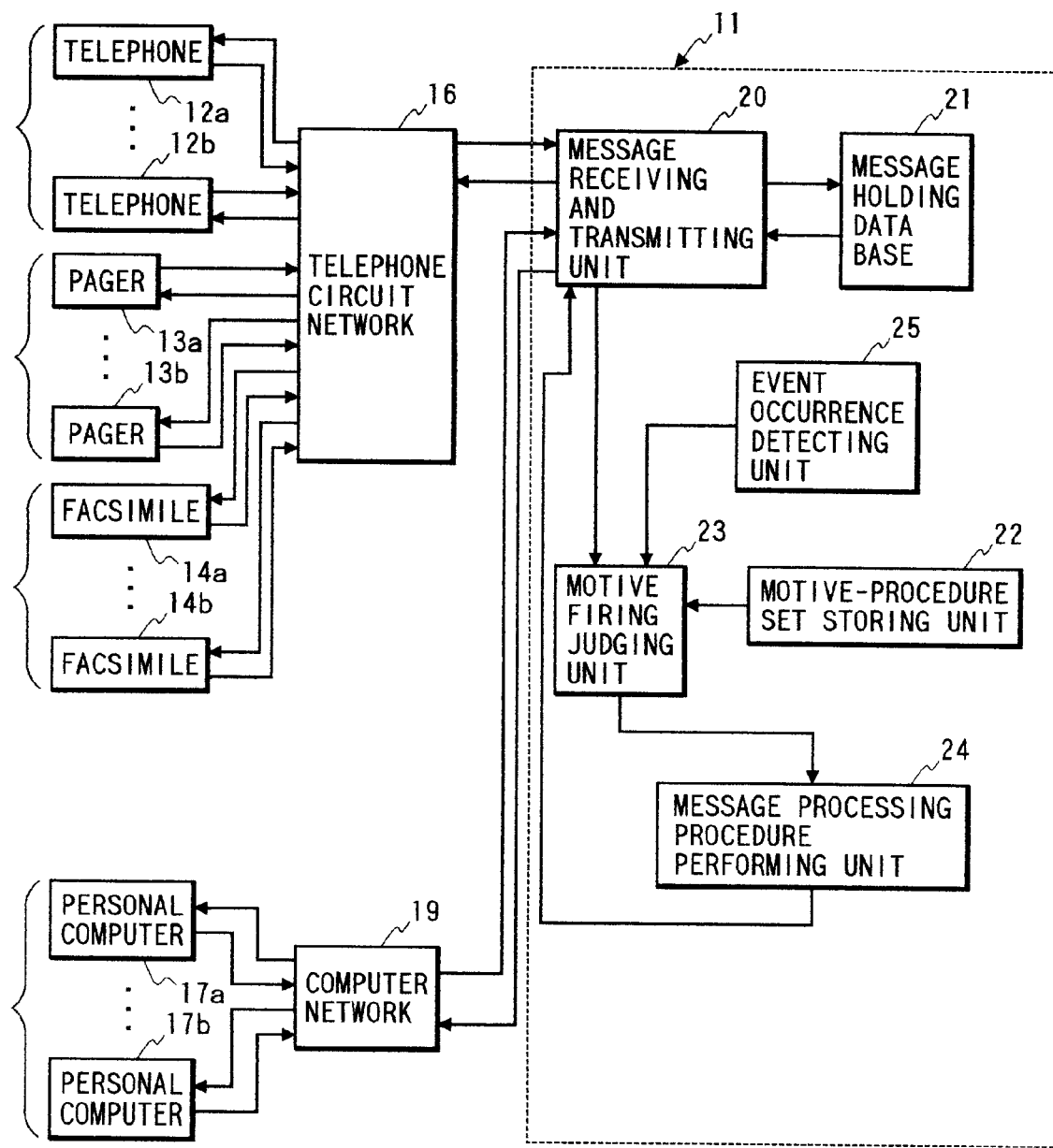
FIG. 1 is a block diagram of a message switching apparatus connected with a plurality of information terminals and a plurality of communication terminals according to a first embodiment of the present invention.

Preferred embodiments of a message switching apparatus according to the present invention are described with reference to the drawings.

The definition of a message processing procedure is initially described.

A message switching, in which a message is sent from a first user to a second user and another message is sent from the second user to the first user by switching a sender from the first user to the second user, is generally performed as follows.

When one of users desires to send a message as a sender to another user denoting a receiver through a message switching apparatus, the message sender prepares contents of a message while using an information terminal such as a personal computer and adds transmission information (or header information) such as a destination address, a sender name, a title of the message and/or a subject of the message to the contents of the message, and the message sender delivers the message with the transmission information to the message switching apparatus. Thereafter, the message with the transmission information is transmitted from the message switching apparatus to a destination address written in the transmission information. The destination address is a specific information or communication terminal or a specific position of a storing apparatus. For example, when the message is transmitted as an electronic mail to a destination address through an internet, the destination address is a specific position (or spool) of a disk apparatus of a specific personal computer. Also, when the message is simultaneously transmitted to a plurality of destination addresses of facsimile apparatuses in which a message is simultaneously received, the destination is a plurality of facsimiles.

In the above message switching, a processing is performed for the message in the message switching apparatus, and the processing for the message in the message switching apparatus is called a message processing procedure. For example, the transmission (or delivery) of a message to a destination address is one typical message processing procedure. Also, there are many message processing procedures represented by the forwarding of a message (that is, the transmission of a message to a forwarding address other than an original destination address), a notification of a message (that is, the transmission of a message prepared in a message switching apparatus), the deletion of a message, the preparation of a duplicated message, the edition of message contents such as the preparation of an abstract of message contents and the translation of a message to another language, data conversion such as the conversion of a text message to an image message and the compression of message contents, and the conversion of a message type such as the conversion of an internet electronic mail type to a peculiar mail type.

Also, in cases where a message processing procedure is expressed by a function, an argument is needed as data to perform the message processing procedure. For example, to forward a message, the message and a forwarding address are needed as arguments. In this specification, a message to be transmitted or forwarded is not explicitly given, and the message is tacitly given. The reason is that a message to be transmitted or forwarded is necessarily needed to perform a message processing procedure and embodiments in this specification are set not to explicitly give a message as an argument.

Next, the definition of a motive is described.

To perform one message processing procedure, an occurrence of an event determining a start of the operation of the message processing procedure is needed. This event is called a motive. A motive is fired when an event occurs, and the operation of one message processing procedure corresponding to the motive is started. For example, the transmission of a message is usually performed as a result of the performance of one message processing procedure when an event "a message is received" is recognized in a message switching apparatus, so that the event "a message is received" becomes a motive for the transmission of a message. Also, the notification of a failure is usually performed as a result of the performance of one message processing procedure when an event "a failure occurs" is recognized in a message switching apparatus, so that the event "a failure occurs" becomes a motive for the notification of a failure. In general, all the operations for messages such as the reception of a message, the transmission of a message and the deletion of a message, the changes of circumstances of a message switching apparatus such as an event "it is twelve o'clock", an event "a used volume of a disk exceeds 90%" and an event "a failure occurs", and a direct instruction from a user or an operation administrator to a message switching apparatus are used as motives.

The occurrence of an event expressing a motive is expressed by an expression "a motive is fired". For example, in cases where a sentence "it is twelve o'clock" is a motive, when it becomes twelve o'clock in a message switching apparatus, the motive is fired.

Finally, the definition of a condition is described.

A condition used in embodiments of this specification denotes a condition of the performance of a message processing procedure, the condition is expressed by a predicate logical equation, and an estimation judgement of truth or false for the predicate logical equation is performed in a message processing procedure performing unit. As an example, general functions such as a function for judging an agreement, a function for judging an inclusion and a function for judging an greater or less relationship are used as conditions, and conditions peculiar to a message switching apparatus such as a test condition for a message switching apparatus are used. For example, a condition "a system is during an operation" and a condition "a message switching apparatus is connected to a network" are used to check the message switching apparatus.

(First Embodiment)

A first embodiment of the present invention is described with reference to FIG. 1 to FIG. 7.

FIG. 1 is a block diagram of a message switching apparatus connected with a plurality of information terminals and a plurality of communication terminals according to a first embodiment of the present invention.

As shown in FIG. 1, a message switching apparatus 11 is connected with a plurality of communication terminals represented by a plurality of telephones 12a and 12b, a plurality of pagers 13a and 13b and a plurality of facsimiles 14a and 14b through a telephone circuit network 16. The telephone circuit network 16 is a public switched telephone network (PSTN), an integrated services digital network (ISDN) or the like. Also, the message switching apparatus 11 is connected with a plurality of information terminals represented by a plurality of personal computers 17*a* and 17*b* through a computer network 19 such as an internet, a wide area network (WAN) or the like. Each personal computer has an electronic mail server. An electronic mail can be transmitted between the message switching apparatus 11 and one personal computer according to any protocol applied for the computer network 19.

In the message switching apparatus 11, an electronic mail transmitted from one of the personal computers is received, information written in the electronic mail is analyzed, and the electric mail is transmitted to one information terminal or communication terminal identified by a destination address written in the electronic mail. In cases where the electronic mail is transmitted to one telephone, the electronic mail written by a text style is converted into a dual tone multi-frequency (DTMF) signal of a push button sound and a voice means in a media conversion in the message switching apparatus 11. Also, in cases where the electronic mail is transmitted to one pager or facsimile, a character transmission can be performed by the message switching apparatus 11.

The message switching apparatus 11 comprises;

- a message receiving and transmitting unit 20 for receiving a particular message of an electronic mail from one information terminal, analyzing header information written in the particular message to detect a sender and a destination address of a receiver from the particular message, and transmitting the particular message to one information terminal identified by the destination address of the receiver;
- a message holding data base 21 for temporarily holding the particular message received by the message receiving and transmitting unit 20 until a message receiving operation is performed in the unit 20;
- a motive-procedure set storing unit 22 for storing a plurality of motive-procedure sets for each user (or receiver), each motive-procedure set being composed of one or more motives and a group of message processing procedures with conditions corresponding to the motives;
- an event occurrence detecting unit 25 for detecting the occurrence of an event generated in the message switching apparatus 11;
- a motive firing judging unit 23 for detecting the occurrence of a particular event detected by the event occurrence detecting unit 25 or the occurrence of a particular event generated in the message receiving and transmitting unit 20 as a result of the reception of the particular message or the transmission of a message, retrieving a plurality of particular motive-procedure sets corresponding to the receiver from the motive-procedure set storing unit 22, selecting a particular motive-procedure set corresponding to a particular motive expressed by the particular event from the plurality of particular motive-procedure sets, and judging the firing of the particular motive; and
- a message processing procedure performing unit 24 for performing a particular message processing procedure with condition of the particular motive-procedure set in cases where it is judged by the motive firing judging unit 23 that the particular motive corresponding to the particular message processing procedure with condition is fired and a particular condition of the particular message processing procedure with condition is satisfied, the particular message being transmitted to the destination address of the receiver in cases where the transmission, the notification or the forwarding of the particular message is designated by the particular message processing procedure with condition.

In the above configuration, an operation of the message switching apparatus 11 is described.

When a particular message transmitted from one information terminal is received in the message receiving and transmitting unit 20, the particular message is temporarily held in the message holding data base 21. Thereafter, the particular message is read out, and a message receiving operation is performed in the unit 20. In the message receiving operation, header information of the particular message is analyzed, and a sender and a destination address of a receiver are detected. For example, a name, a zip code and an address of an electronic mail are detected as user address information of the sender and the receiver. In this case, it is applicable that the destination address of the receiver is the message holding data base 21. Also, a media conversion such as the conversion of a text to a voice is performed for the particular message if required. Thereafter, the header information of the particular message and the user address information are transmitted to the motive firing judging unit 23 as an event.

Thereafter, in the motive firing judging unit 23, a plurality of particular motive-procedure sets corresponding to the receiver are retrieved from the motive-procedure set storing unit 22, and one particular motive-procedure set corresponding to a particular motive expressed by a particular event is selected. In cases where the particular motive is expressed by a particular event corresponding to a message received or transmitted in the message receiving and transmitting unit 20, the particular event occurring in the unit 20 is detected by the motive firing judging unit 23. Also, in cases where the particular motive is expressed by a particular event corresponding to the changes of circumstances of the message switching apparatus 11 or a direct instruction from a user or an operation administrator to the message switching apparatus 11, the occurrence of the particular event is detected by the event occurrence detecting unit 25, and the occurrence of the particular event is informed the motive firing judging unit 23.

Figure 2:
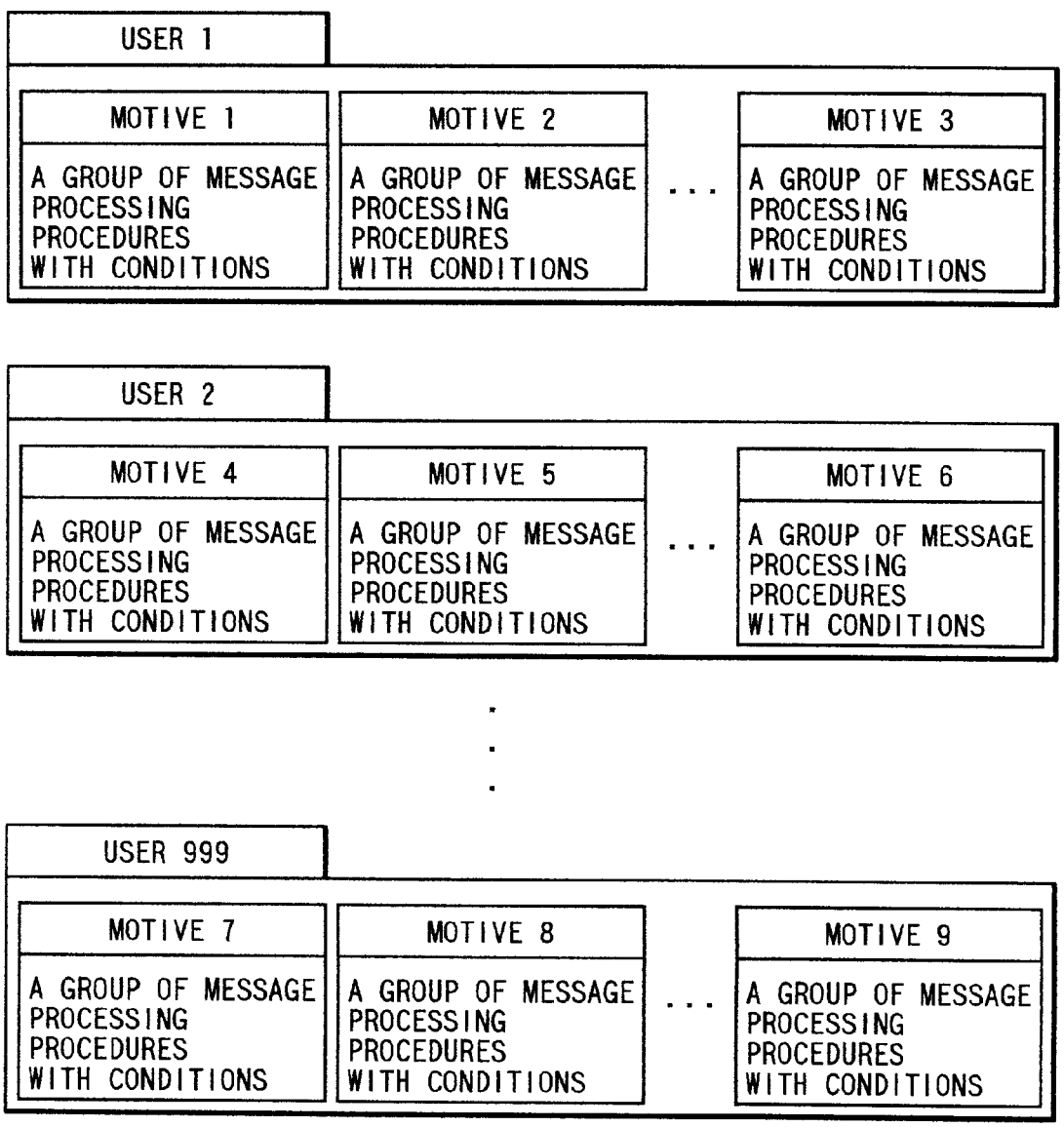
FIG. 2 shows a plurality of motive-procedure sets corresponding to a user 1 and a plurality of motive-procedure sets corresponding to a user 2.
Figure 3:
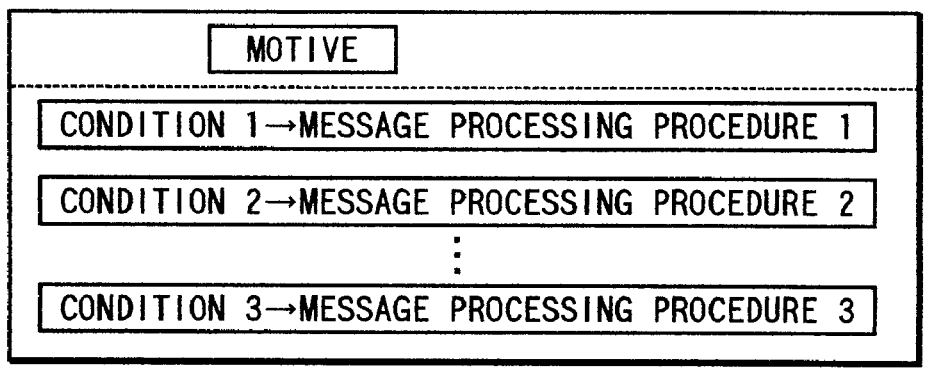
FIG. 3 shows a motive-procedure set composed of a motive and a group of message processing procedures with conditions corresponding to the motive.

FIG. 2 shows a plurality of motive-procedure sets corresponding to a user 1 and a plurality of motive-procedure sets corresponding to a user 2, and FIG. 3 shows one motive-procedure set composed of a motive and a group of message processing procedures with conditions corresponding to the motive.

As shown in FIG. 2, a plurality of motive-procedure sets are stored in the motive-procedure set storing unit 22 for each user, and each motive-procedure set is, as shown in FIG. 3, composed of one motive and one group of message processing procedures with conditions corresponding to the motive.

Here, each motive is expressed by an event determining a start of the performance of a group of message processing procedures with conditions corresponding to the motive, and the occurrence of an event expressing a motive is called "a motive is fired". As a motive, an event relating to the reception or transmission of a message is used. For example, an event "a message receiving operation for a user (a sender or a receiver) is started", an event "a message receiving operation for a user (a sender or a receiver) is completed", an event "a message transmission operation for a user (a sender or a receiver) is started" or an event "a message transmission operation for a user (a sender or a receiver) is completed" is used as a motive. Also, an event relating to circumstances of the message switching apparatus 11 or circumstances of a real space is used as a motive. For example, an event "it reaches to a prescribed time" or an event "an empty volume of a disk is less than a prescribed value" is used as a motive. Also, an event relating to an operation of the message switching apparatus 11 is used as a motive. For example, an event "some message processing procedure is successfully completed", an event "some message processing procedure is failed" or an event "a group of motive-procedure sets corresponding to some user is deleted from the motive-procedure set storing unit 22" is used as a motive.

Each message processing procedure with condition is a type of production rule, and a message processing procedure is performed when a condition added to the message processing procedure is satisfied.

Figure 4:
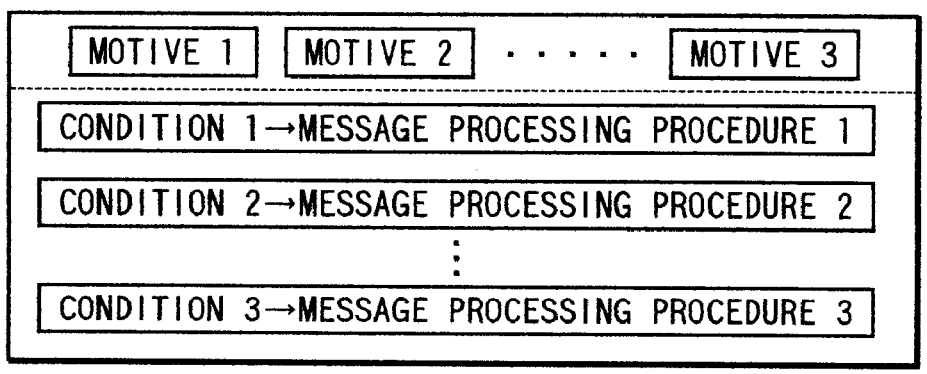
FIG. 4 shows a motive-procedure set composed of a plurality of motives and a group of message processing procedures with conditions corresponding to the motives according to a modification of the first embodiment.

Thereafter, it is judged by the motive firing judging unit 23 whether or not the particular motive of the particular motive-procedure set is fired. In cases where a particular event expressing the particular motive occurs, the particular motive is fired, and the firing of the particular motive is informed the message processing procedure performing unit 24. In the unit 24, one or more particular message processing procedures with conditions corresponding to the particular motive are performed. As shown in FIG. 4, in cases where a plurality of motives exist in one motive-procedure set, when one of the motives is fired, it is regarded that all the motives are fired, and a plurality of message processing procedure with conditions corresponding to the motives are performed in the message processing procedure performing unit 24.

Each condition added to one message processing procedure is expressed by a predicate logical equation, and the satisfactory of the condition can be judged by checking header information of a message. For example, a predicate logical equation "a title of a message is xxx", "a sender of a message is YYY" or "a character or a phrase ZZZ exists in the body of a message is used as a condition. Therefore, header information of a message" is checked in the message processing procedure performing unit 24 to judge whether one condition added to one message processing procedure is satisfied.

In cases where one condition added to one particular message processing procedure is satisfied, the particular message processing procedure is performed in the message processing procedure performing unit 24. The message processing procedure is a processing for the message. For example, a processing "transmission", "forwarding", "notification", "deletion", "new preparation", "translation", "media conversion for the body of a message", "abstract" or "excerpt of a portion of message" is performed in one message processing procedure. Thereafter, in cases where a processing "forwarding" or "notification" is performed in one particular message processing procedure in the unit 24, the particular message is transmitted to the destination address of a receiver.

Figure 5:
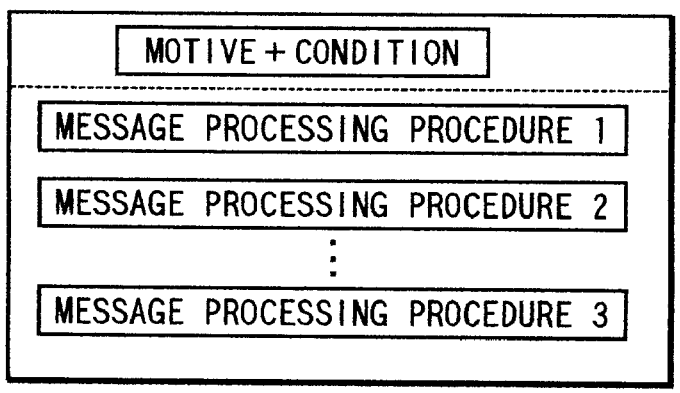
FIG. 5 shows a motive-procedure set composed of a motive and a condition expressed by one predicate logical equation and a message processing procedure.

In this embodiment, each motive-procedure set is classified into one group of motives, one group of conditions and one group of message processing procedures independent from each other because an efficiency for processing a message is high. However, as shown in FIG. 5, it is preferred that one motive and one condition be expressed by one predicate logical equation. For example, a predicate logical equation "a title of a message, for which a receiving operation is completed, is WWW" can be used as a combination of one motive and one condition. In this case, the completion of a receiving operation corresponds to one motive, and a title WWW corresponds to one condition.

An example of a message reception and transmission is described.

FIG. 6A shows a first message M1 transmitted to the message switching apparatus 11, FIG. 6B shows a second message M2 transmitted to the message switching apparatus 11, and FIG. 7 shows an example of a motive-procedure set.

As shown in FIGS. 6A and 6B, the messages M1 and M2 are respectively transmitted through an internet as an electronic mail. Each message is composed of a message header (or header information) and a body. The message header is abbreviated for convenience.

In FIG. 7, a motive-procedure set MP1 is stored for a user U1 in the motive-procedure set storing unit 22. A motive MT1 is fired when a receiving operation for a message planned to be transmitted to a user U1 is completed. When the motive MT1 is fired, a message processing procedure with condition PC1 and a message processing procedure with condition PC2 are performed. The procedure PC1 denotes a message processing that a notification of an incoming call is transmitted to a pager of the user U1 in cases where a phrase "urgent communication" is included in a subject of a received message, and the procedure PC2 denotes a message processing that a received message is deleted not to be transmitted to a receiver in cases where a sender of the message is a user U100.

In a first example, when a user U2 transmits an electronic mail with a message M1 from the personal computer 17a to the message receiving and transmitting unit 20, the electronic mail M1 is temporarily stored in the message holding data base 21. Thereafter, in the unit 20, a message type of the electronic mail M1 is checked, and a sender U2 and a destination address of a receiver U1 are identified. Therefore, a message receiving operation is completed, and the completion of the message receiving operation is informed the motive firing judging unit 23.

In the unit 23, a plurality of particular motive-procedure sets corresponding to the receiver U1 are retrieved from the motive-procedure set storing unit 22, and a particular motive-procedure set MP1 corresponding to a particular motive MT1 expressed by an event "the completion of the message receiving operation" is selected from the particular motive-procedure sets. Thereafter, it is judged by the motive firing judging unit 23 whether or not the particular motive MT1 is fired.

Because the event "the completion of the message receiving operation" occurs in the message receiving and transmitting unit 20, it is judged that the particular motive MT1 is fired, and the message processing procedures with conditions PC1 and PC2 are performed in the message processing procedure performing unit 24.

In detail, it is checked whether or not a condition of the message processing procedure PC1 is satisfied. Because the subject of the message M1 is "(urgent communication) the change of the meeting", it is judged that a predicate logical equation "include (Subject, "urgent communication") of the message processing procedure with condition PC1 is satisfied. Therefore, the message processing procedure is performed, so that an incoming call of the message M1 is transmitted to a pager of the user U1 to notify the user U1 of the reception of the message M1. Thereafter, it is checked whether or not a condition of the message processing procedure PC2 is satisfied. Because the sender is the user U2, the condition is not satisfied. Therefore, the message processing procedure "message deletion" is not performed, and the message M1 is held in the message receiving and transmitting unit 20. Thereafter, the message receiving and transmitting unit 20 transmits the message M1 to a mail spool directory of a mail server of a personal computer according to the destination address of the user 1.

Next, in a second example, when a user U100 transmits an electronic mail with a message M2 from the personal computer 17b to the message receiving and transmitting unit 20, a message receiving operation is completed, and the completion of the message receiving operation is informed the motive firing judging unit 23 in the same manner as in the first example.

Thereafter, it is judged that the particular motive MT1 is fired, and the message processing procedures with conditions PC1 and PC2 are performed in the message processing procedure performing unit 24 in the same manner as in the first example. Because the subject of the message M2 is "Big Business", it is judged that the predicate logical equation of the message processing procedure with condition PC1 is not satisfied. Therefore, any incoming call is not transmitted to the user U1. Thereafter, it is checked whether or not a condition of the message processing procedure PC2 is satisfied. Because the sender is the user U100, the condition is satisfied. Therefore, the message processing procedure "message deletion" is performed, and the message M2 is deleted in the message receiving and transmitting unit 20.

In cases where the message processing procedures with conditions PC1 and PC2 are satisfied in another example, one of the procedures has a priority, so that one procedure having a priority is performed.

Accordingly, because a motive expressed by an event and a message processing procedure with condition are used in the message switching apparatus to automatically perform a message processing, various message processing procedures corresponding to various requests of a plurality of users can be set in the motive-procedure set storing unit 22, and a group of particular message processing procedures can be automatically performed at an appropriate timing and an appropriate circumstance.

Also, even though a user does not have a knowledge of a personal computer so much, because various message processing procedures suitable for circumstances of the user are set in advance, the user can easily use the message switching apparatus 11 as a high functional message processing tool.

In this embodiment, a message required for an automatic message processing (the firing of a motive and the performance of a message processing procedure with condition) is tacitly specified to a message received just now without using any argument. However, it is applicable that each message be explicitly specified by using an argument.

Also, in this embodiment, though a pager number identifying a pager of a receiver is required to notify the receiver, the pager of the receiver is tacitly specified without using any pager number. However, it is applicable that the pager of the receiver be explicitly specified by using a pager number. In this case, a pager number of each pager is stored in advance in the message receiving and transmitting unit 20.

(Second Embodiment)

In this embodiment, the editing of a motive-procedure set such as a new registration of a motive-procedure set or a deletion of a motive-procedure set is performed by a user in cooperation with a message switching apparatus.

Figure 8:
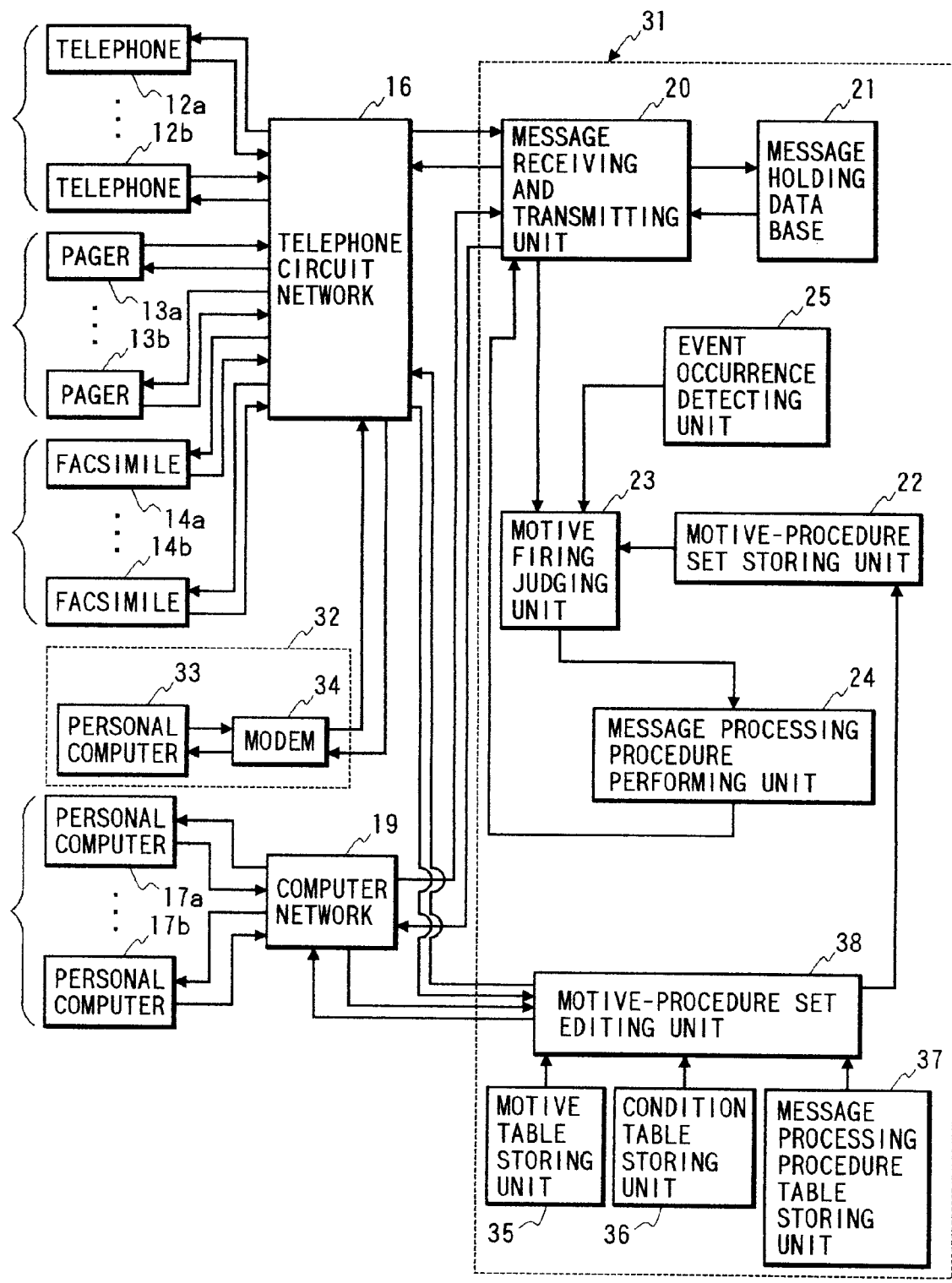
FIG. 8 is a block diagram of a message switching apparatus connected with a plurality of information terminals and a plurality of communication terminals according to a second embodiment of the present invention.

FIG. 8 is a block diagram of a message switching apparatus connected with a plurality of information terminals and a plurality of communication terminals according to a second embodiment of the present invention.

As shown in FIG. 8, a message switching apparatus 31 is connected with the plurality of telephones 12a and 12b, the plurality of pagers 13a and 13b, the plurality of facsimiles 14a and 14b and the plurality of personal computers 17a and 17b in the same manner as the message switching apparatus 11. In addition, the message switching apparatus 31 is connected with a computer system 32 through the telephone circuit network 16. The computer system 32 comprises a personal computer 33 and a modem 34, and a data communication is performed between the message switching apparatus 31 and the computer system 32.

The message switching apparatus 31 comprises:

the message receiving and transmitting unit 20, the message holding data base 21, the motive-procedure set storing unit 22, the motive firing judging unit 23, the message processing procedure performing unit 24, a motive table storing unit 35 for storing a plurality of motive elements as a motive table, each motive element being composed of a name of a motive and a substance of the motive, a condition table storing unit 36 for storing a plurality of condition elements as a condition table, each condition element being composed of a name of a condition, a language expression of the condition, the number of arguments for the condition, an argument type set for each argument, and a substance of the condition, a message processing procedure table storing unit 37 for storing a plurality of message processing procedure elements as a message processing procedure table, each message processing procedure element being composed of a name of a message processing procedure, a language expression of the message processing procedure, the number of arguments for the message processing procedure, an argument type set for each argument, and a substance of the message processing procedure, and a motive-procedure set editing unit 38 with graphical user interface (GUI) for editing a motive-procedure set according to an intention of a user operating one personal computer by referring the motive table stored in the motive table storing unit 35, the condition table stored in the condition table storing unit 36 and the message processing procedure table stored in the message processing procedure table storing unit 37.

In the above configuration, an operation of the message switching apparatus 31 is described.

FIG. 9 shows a plurality of motive elements stored in the motive table storing unit 35, FIG. 10 shows a plurality of condition elements stored in the condition table storing unit 36, and FIG. 11 shows a plurality of message processing procedure elements stored in the message processing procedure table storing unit 37.

The motive-procedure set editing unit 38 has a function as a server of a hypertext transfer protocol (HTTP). Therefore, when a user operating one personal computer 17a or 17b desires to edit a particular motive-procedure set, a client software installed in the personal computer is executed, the personal computer is connected with the motive-procedure set editing unit 38 at a transmission control protocol/internet protocol (TCP/IP), and the editing of the particular motive-procedure set is performed in the motive-procedure set editing unit 38 according to an intention of the user while referring the motive table, the condition table and the message processing procedure table stored in the storing units 35, 36 and 37. The operation of the motive-procedure set editing unit 38 is not limited to the TCP/IP. For example, it is applicable that the Xwindow system or the Windows OS of the Microsoft Co. Ltd. be used to operate the motive-procedure set editing unit 38.

Also, when a user operating one personal computer 33 desires to edit a particular motive-procedure set, the personal computer 33 is connected with the motive-procedure set editing unit 38 through the telephone circuit network 16, and a data communication between the personal computer 33 and the motive-procedure set editing unit 38 is performed at a point-to-point protocol (PPP) to edit the particular motive-procedure set.

For example, in cases where the user has an intention that an incoming call of a message sent for the user is automatically transmitted to user's pager when a character string "urgent communication" is included in a subject of the message, the edition of a particular motive-procedure set performed in the motive-procedure set editing unit 38 is described in detail with reference to FIG. 12 to FIG. 18.

Figure 12:
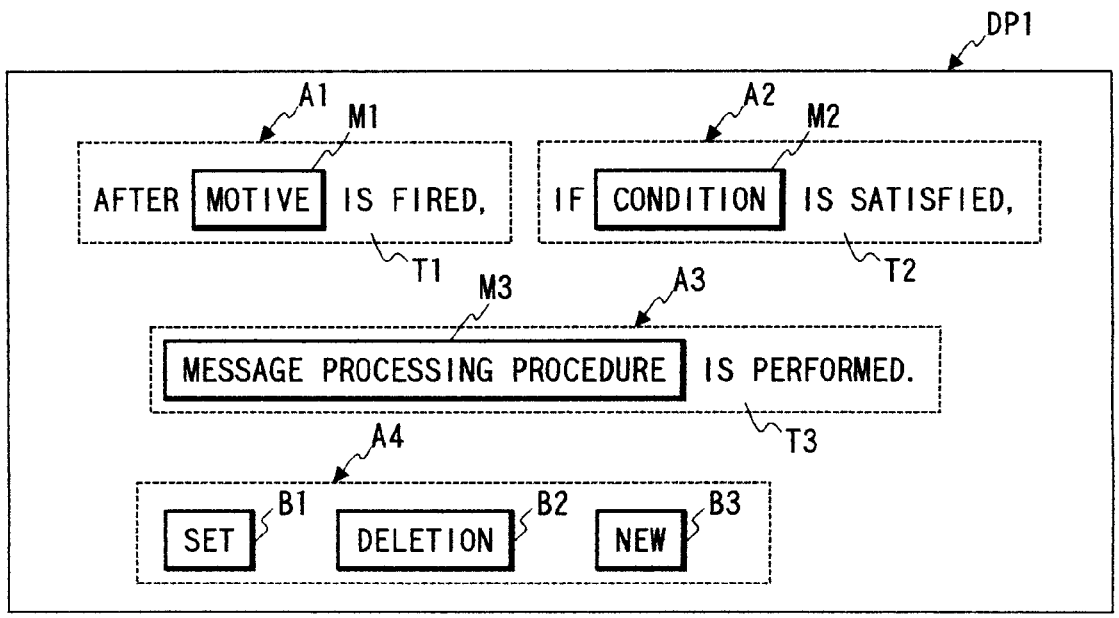
FIG. 12 shows an editing image initially displayed on a display plane of one computer when a user desires to edit a particular motive-procedure set.
Figure 13:
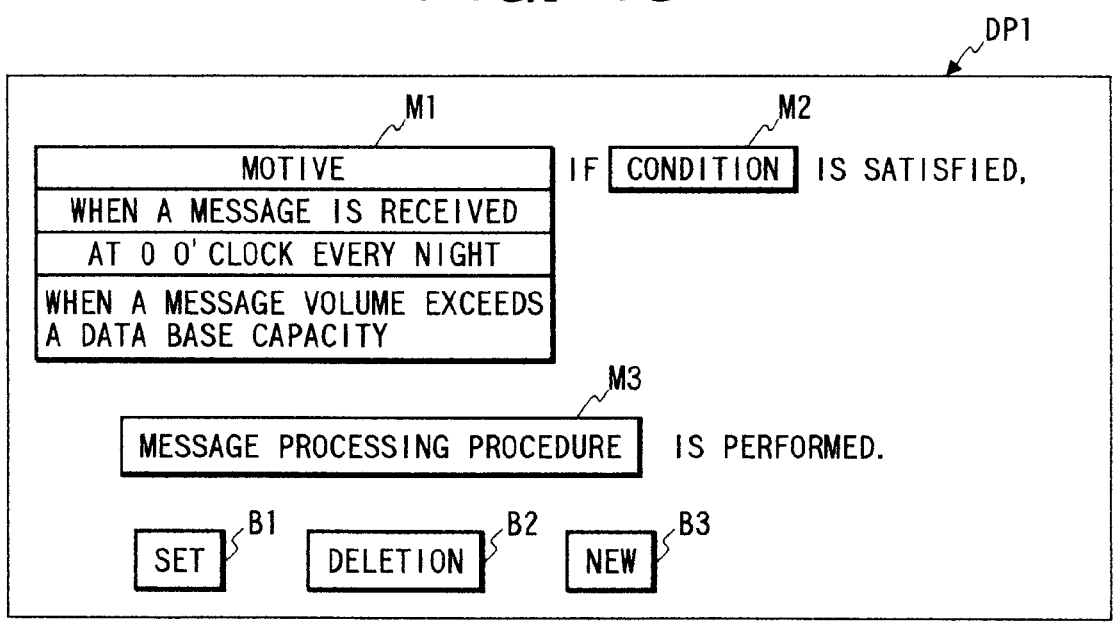
FIG. 13 shows the selection of a motive from a plurality of motives displayed in a motive pull-down menu.
Figure 14:
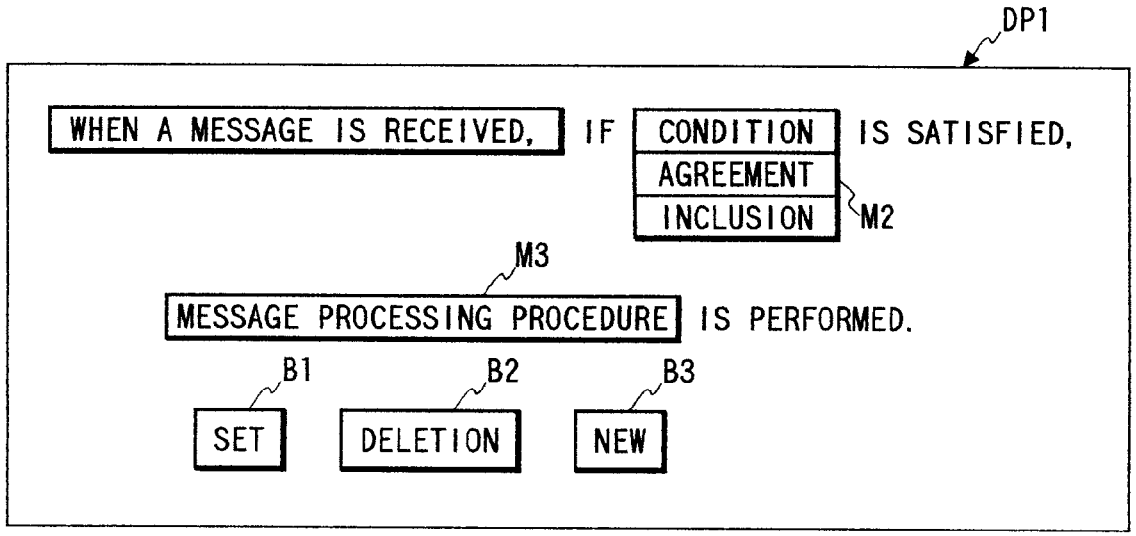
FIG. 14 shows the selection of a condition from a plurality of conditions displayed in a condition pull-down menu after the selection of a motive.
Figure 16:
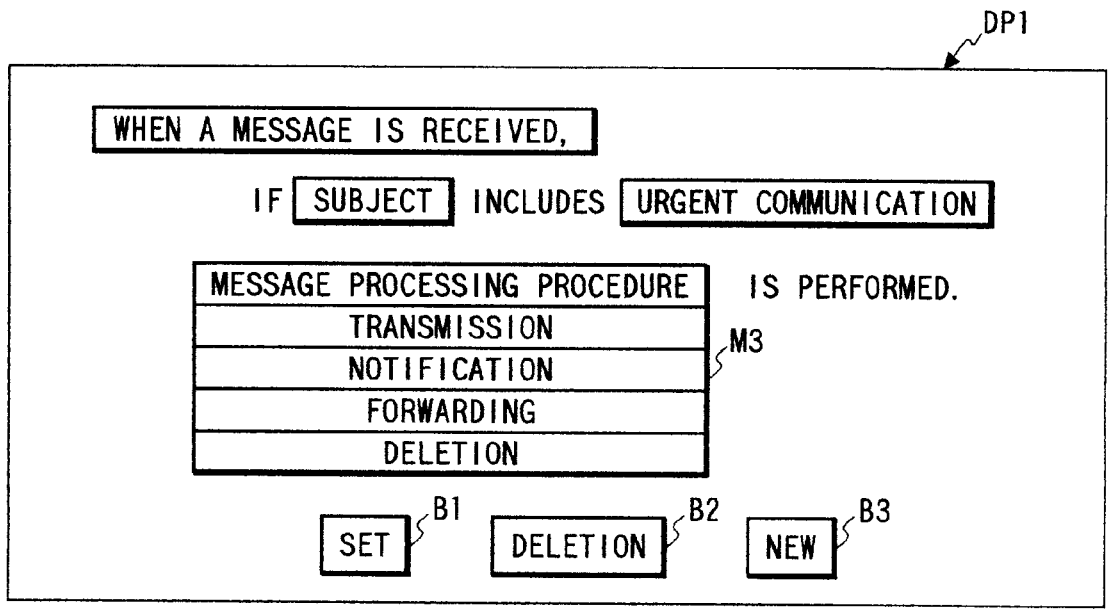
FIG. 16 shows the selection of a message processing procedure from a plurality of types of message processing procedures displayed in a message processing procedure pull-down menu.
Figure 17:
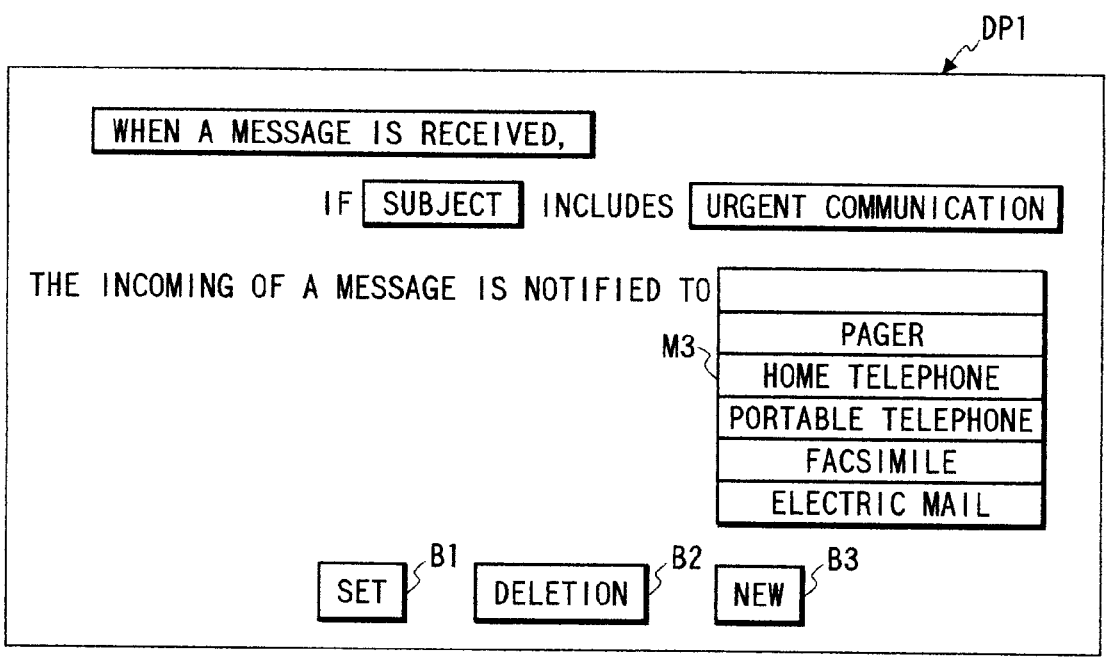
FIG. 17 shows the setting of an argument of the message processing procedure.
Figure 18:
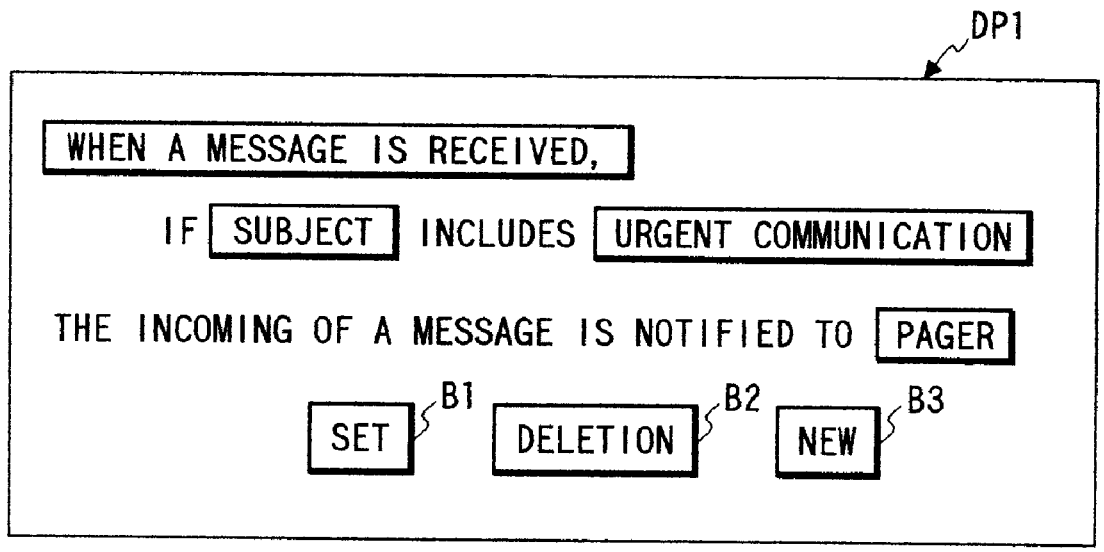
FIG. 18 shows an editing completed image of the particular motive-procedure set.

FIG. 12 shows an editing image initially displayed on a display plane of one personal computer when the user desires to edit a particular motive-procedure set, FIG. 13 shows the selection of a motive from a plurality of motives displayed in a motive pull-down menu, FIG. 14 shows the selection of a condition from a plurality of conditions displayed in a condition pull-down menu after the selection of a motive, FIG. shows the setting of an argument of the condition, FIG. 16 shows the selection of a message processing procedure from a plurality of types of message processing procedures displayed in a message processing procedure pull-down menu, FIG. 17 shows the setting of an argument of the message processing procedure, and FIG. 18 shows an editing completed image of the particular motive-procedure set.

As shown in FIG. 12, when a user instructs the edition of a particular motive-procedure set to one personal computer, a text T1 of a pull-down menu M1 used to select a motive, a text T2 of a pull-down menu M2 used to select a condition and a text T3 of a pull-down menu M3 used to select a message processing procedure are initially displayed in an editing display plane DP1 of the personal computer under the control of the motive-procedure set editing unit 38. The pull-down menu M1 is arranged in a rectangular area A1 surrounded by a dotted line. Also, the pull-down menu M2 is arranged in a rectangular area A2, and the pull-down menu M3 is arranged in a rectangular area A3. Each dotted line is not actually displayed in the editing display plane DP1. Also, a setting button B1 used to store an editing result displayed in the areas A1 to A3 of the editing display plane DP1 in the motive-procedure set storing unit 22 as a motive-procedure set newly prepared, a deletion button B2 used to delete a motive-procedure set displayed in the editing display plane DP1 from the motive-procedure set storing unit 22 and a new preparation button B3 used to display the texts T1, T2 and T3 in the editing display plane DP1 as an initial image for the editing of a motive-procedure set are displayed in a button area A4. The image shown in FIG. 12 is obtained when the user selects the new preparation button B3.

Thereafter, the setting of a motive is performed by the user. When the user selects the pull-down menu M1, the motive-procedure set editing unit 38 refers to a motive table stored in the motive table storing unit 35, the pull-down menu M1 is opened, and a plurality of names of motives transmitted from the motive-procedure set editing unit 38 are displayed as contents of the pull-down menu M1 as shown in FIG. 13. When the user selects one name of one motive "when a message is received", a text "when a message is received" is displayed in the area A1. Also, the user's selection of the name is informed the motive-procedure set editing unit 38, a substance of the motive "when a message is received" stored in the motive table storing unit 35 is transmitted to the motive-procedure set editing unit 38, and the substance of the motive is temporarily stored in a temporarily storing area of the message holding data base 21 under the control of the motive-procedure set editing unit 38.

Thereafter, the setting of a condition is performed by the user. In detail, when the user selects the pull-down menu M2, the motive-procedure set editing unit 38 refers to a condition table stored in the condition table storing unit 36, the pull-down menu M2 is opened, and a plurality of names of conditions transmitted from the motive-procedure set editing unit 38 are displayed as contents of the pull-down menu M2 as shown in FIG. 14. When the user selects one name "inclusion", the user's selection of the name "inclusion" is informed the motive-procedure set editing unit 38. In the motive-procedure set editing unit 38, the number of arguments for the "inclusion" is checked by referring the condition table. In cases where the number of arguments is one or more, the setting of an argument is required. In contrast, in cases where no argument is listed in the condition table, the setting of an argument is not required. In this example, because the number of arguments for the "inclusion" is two, the setting of a first argument and a second argument is required, and an image for setting the arguments is displayed in the editing display plane DP1. Thereafter, the motive-procedure set editing unit 38 refers to a column of the language expression for the "inclusion" to set the arguments. In a column of the language expression, a sentence expressed by a natural language is written to help the user to input the arguments. In this example, because the "inclusion" is selected, a sentence "$1 includes $2" is displayed on the user side. The symbols $1 and $2 respectively function as a space holder, and a numeral following the symbol $ denotes the number of the argument. For example, $1 is a space holder for the first argument.

The language expression is displayed according to a following rule. In cases where the argument type is an enumeration type, a plurality of candidates for an argument are displayed in the pull-down menu M2. In this example, items "subject" and "from" are displayed. The selection of the item "subject" denotes that a phrase included in a subject of a message is specified, and the selection of the item "from" denotes that a sender of a message is specified. In cases where the argument type is a character string type, a character string input box is displayed for the user to input a character string in the box. In cases where the argument type is a numeral type, a numeral input box is displayed for the user to input numerals in the box. In cases where the argument type is a derivation type obtained by combining a plurality of fundamental types such as a character string type, a numeral type and an enumeration type, images corresponding to a plurality of fundamental types included in the derivation type are displayed. Also, in cases where the derivation type includes a sub-derivation type, the sub-derivation type is again divided into a plurality of fundamental types.

Figure 15:
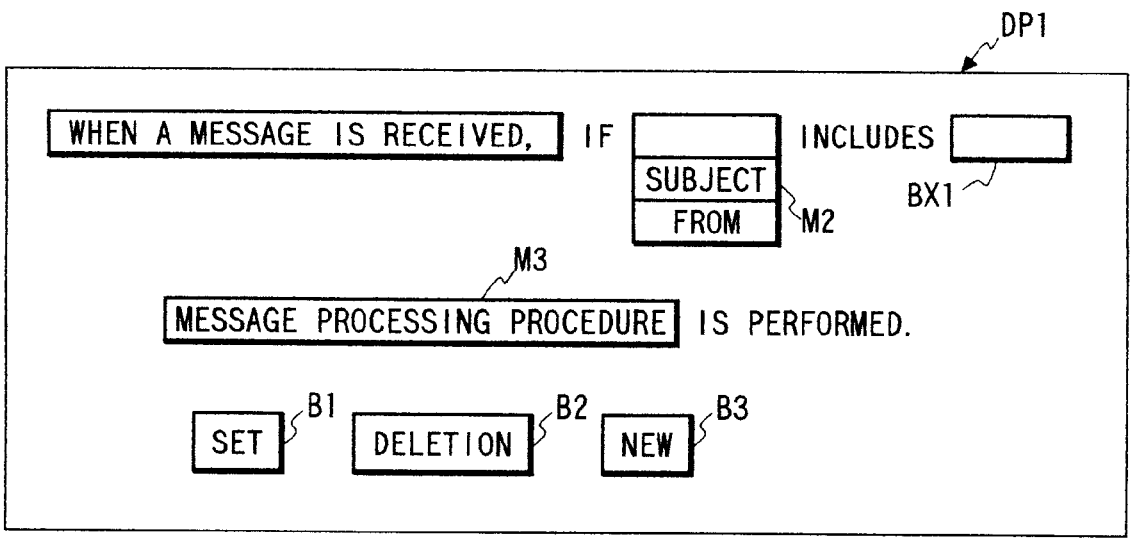
FIG. 15 shows the setting of an argument of the condition.

In this example, because the first argument is an enumeration type, as shown in FIG. 15, the pull-down menu M2 including the items "subject" and "from" is displayed in a space indicated by the space holder $1, and a character string input box BX1 is displayed in a space indicated by the space holder $2. Thereafter, the user selects the item "subject" from the pull-down menu M2 and inputs a character string "urgent communication" in the character string input box BX1 according to the user's intention. Therefore, as shown in FIG. 16, the first and second arguments are determined, so that the condition is determined. Also, the user's selection of the arguments is informed the motive-procedure set editing unit 38, so that the user's selection of the substance of the condition "inclusion (subject, "urgent communication")" is acknowledged in the motive-procedure set editing unit 38. The substance of the condition "inclusion (subject, "urgent communication")" is stored in the temporarily storing area of the message holding data base 21.

Thereafter, the setting of a message processing procedure is performed by the user in the same manner as in the setting of a condition. In detail, when the user selects the pull-down menu M3, the motive-procedure set editing unit 38 refers to a message processing procedure table stored in the message processing procedure table storing unit 37, the pull-down menu M3 is opened, and a plurality of names of message processing procedures transmitted from the motive-procedure set editing unit 38 are displayed as contents of the pull-down menu M3 as shown in FIG. 16. When the user selects one name "notification", the user's selection of the name "notification" is informed the motive-procedure set editing unit 38. In the motive-procedure set editing unit 38, the number of arguments for the name "notification" is checked by referring the message processing procedure table. Because the number of arguments is one in this example, an image for setting an argument is prepared by the motive-procedure set editing unit 38. That is, the motive-procedure set editing unit 38 refers to a column of a language expression for the name "notification" and a column of an argument type for the name "notification". In this example, because the language expression for the name "notification" is "the incoming of a message is notified to $1" and the argument type for the name "notification" is an enumeration type, the language expression "the incoming of a message is notified to $1" is displayed in the editing display plane DP1, and a plurality of candidates for the argument are displayed in the area of the space holder $1 as the pull-down menu M3. In this example, as shown in FIG. 17, items "pager", "home telephone", "portable telephone", "facsimile" and "electronic mail" are displayed as the pull-down menu M3. Thereafter, when the user selects the item "pager", the argument is set, and an image of a message processing procedure shown in FIG. 18 is displayed in the editing display plane DP1. Also, the selection of the substance of the message processing procedure "notification (pager)" is informed the motive-procedure set editing unit 38, and the substance of the message processing procedure "notification (pager)" is temporarily stored in the temporarily storing area of the message holding data base 21.

Figure 19:
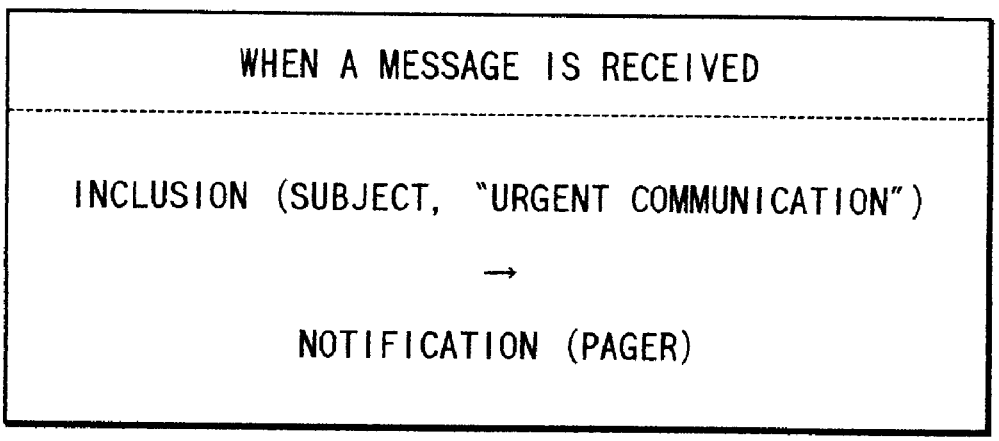
FIG. 19 shows the particular motive-procedure set.

Because the setting of the motive, the setting of the condition and the setting of the message processing procedure are completed, the user selects the setting button B1. Because the final confirmation of the user for the setting is obtained, the substance of the motive "when a message is received", the substance of the condition "inclusion (subject, "urgent communication")" and the substance of the message processing procedure "notification (pager)" stored in the temporarily storing area of the message holding data base 21 are combined as a particular motive-procedure set shown in FIG. 19 under the control of the motive-procedure set editing unit 38, and the particular motive-procedure set is stored in the motive-procedure set storing unit 22 to be included in a group of motive-procedure sets for the user. That is, the registration of the particular motive-procedure set is completed.

Therefore, after the particular motive-procedure set prepared according to the user's intention that an incoming call of a message sent for the user is automatically transmitted to user's pager when a subject of the message includes a character string "urgent communication" is registered in the motive-procedure set storing unit 22, in cases where someone sends a message to the user and the motive of the particular motive-procedure set is fired, the message processing procedure with condition of the particular motive-procedure set is performed in the message processing procedure performing unit 24, and an incoming call of the message is notified to the user just after the message is received in the message switching apparatus 31 in cases where a character string "urgent communication" is included in a subject of the message.

Accordingly, even though a user does not have a technical knowledge of a personal computer or a technical knowledge of a message switching apparatus, the setting of a motive-procedure set reflecting user's intention can be easily performed. Also, any motive-procedure set possible to be set in the message switching apparatus 31 can be easily set by the user.

(Third Embodiment)

In a third embodiment, a motive-procedure set is automatically prepared according to a voice communication between a message switching apparatus and a user.

Figure 20:
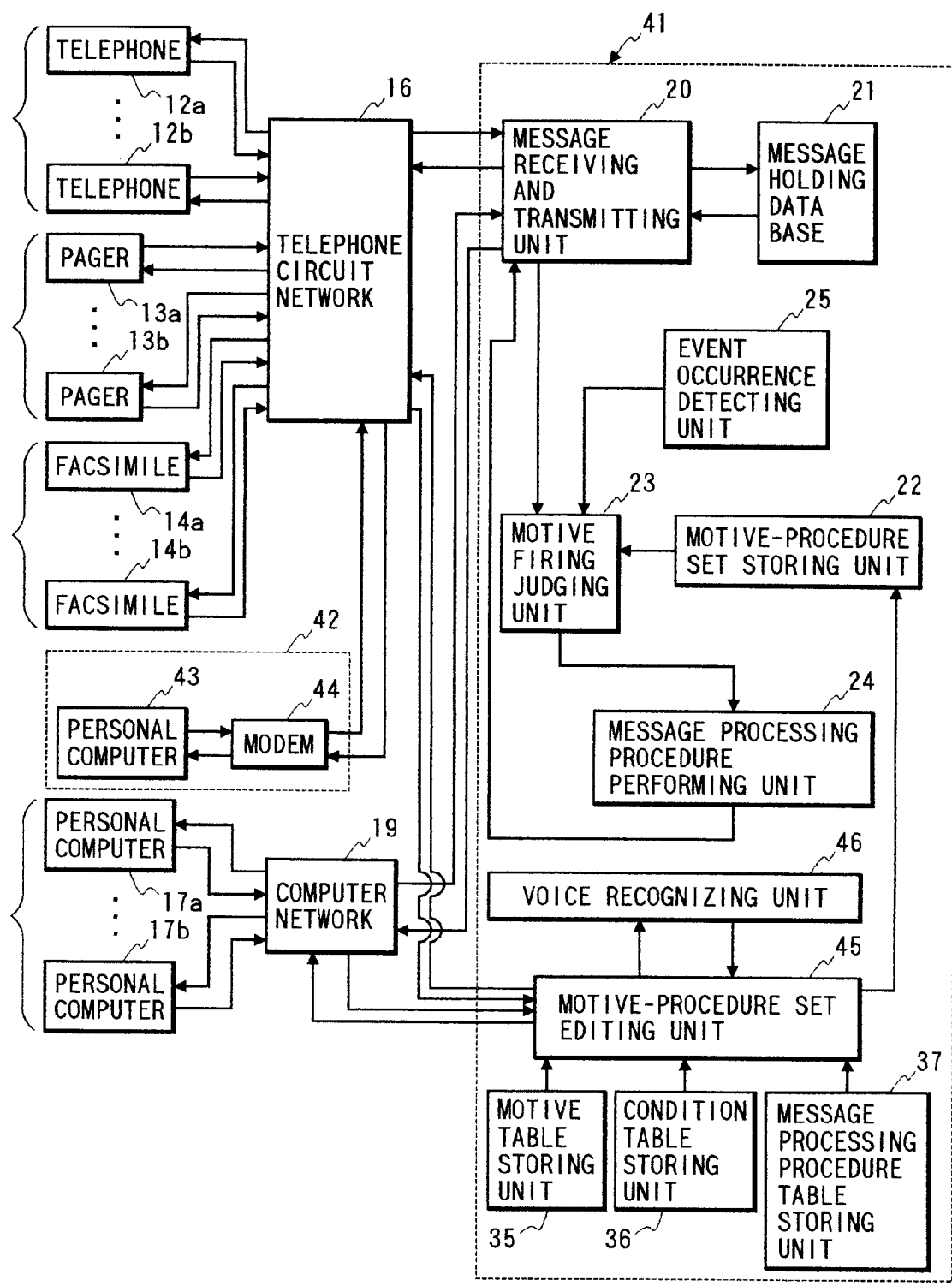
FIG. 20 is a block diagram of a message switching apparatus connected with a plurality of information terminals and a plurality of communication terminals according to a third embodiment of the present invention.

FIG. 20 is a block diagram of a message switching apparatus connected with a plurality of information terminals and a plurality of communication terminals according to a third embodiment of the present invention.

As shown in FIG. 20, a message switching apparatus 41 is connected with the plurality of telephones 12a and 12b, the plurality of pagers 13a and 13b, the plurality of facsimiles 14a and 14b and the plurality of personal computers 17a and 17b in the same manner as the message switching apparatus 11. In addition, the message switching apparatus 41 is connected with a computer system 42 through the telephone circuit network 16. The computer system 42 comprises a personal computer 43 with a voice input-output unit and a modem 44, and a voice communication is performed between the message switching apparatus 41 and the computer system 42.

The message switching apparatus 41 comprises:
the message receiving and transmitting unit 20, the message holding data base 21, the motive-procedure set storing unit 22, the motive firing judging unit 23, the message processing procedure performing unit 24, the motive table storing unit 35, the condition table storing unit 36, the message processing procedure table storing unit 37, a motive-procedure set editing unit 45 for giving a voiced guidance to a user operating one communication terminal, one information terminal or the personal computer 43 in a synthesized voice, receiving an instruction (or a reply) of the user in a user's voice, editing a motive-procedure set according to the instruction of the user by referring the motive table stored in the motive table storing unit 35, the condition table stored in the condition table storing unit 36 and the message processing procedure table stored in the message processing procedure table storing unit 37 and storing the motive-procedure set corresponding to the user in the motive-procedure set storing unit 22 in cases where the motive-procedure set is newly prepared, and a voice recognizing unit 46 for recognizing the user's voice received by the motive-procedure set editing unit 45 as the instruction of the user, converting the user's voice into a natural language character string corresponding to the user's voice and outputting the natural language character string to the motive-procedure set editing unit 45 to edit a motive-procedure set according to the natural language character string.

In the above configuration, an operation of the message switching apparatus 41 is described in brief.

When a user calls the motive-procedure set editing unit 45 by the telephone 12*a* through the telephone circuit network 16, the user inputs his user identifying number by using push-buttons to recognize the user in the message switching apparatus 41. Thereafter, a voiced guidance is output from the motive-procedure set editing unit 45 to the user, the user gives an instruction to the message switching apparatus 41 in a voice, and the user voice is recognized by the voice recognizing unit 46. In this case, a plurality of natural language character candidates for each uttered character included in the user's voice are registered in advance in the voice recognizing unit 46, so that a character recognition of the voice recognizing unit 46 can be enhanced. Thereafter, a plurality of recognized natural language characters are output to the motive-procedure set editing unit 45, and the editing of a motive-procedure set is performed according to the recognized natural language characters in the motive-procedure set editing unit 45 in the same manner as in the motive-procedure set editing unit 38.

The preparation of a particular motive-procedure set is described in detail with reference to FIG. 21.

FIG. 21 shows an example of a voice communication between the message switching apparatus 41 and the user.

For example, the user has an intention that an incoming call of a message sent for the user is automatically transmitted to user's pager from the message switching apparatus 41 when a character string "urgent communication" is included in a subject of the message. Therefore, the user desires to prepare a particular motive-procedure set by performing a voice conversation with the message switching apparatus 41 and to store the particular motive-procedure set corresponding to him in the motive-procedure set storing unit 22.

As shown in FIG. 21, when the message switching apparatus 41 receives user's identifying number, a voice recognition of a motive is performed. That is, a voiced guidance "what is a motive?" (line 1) is given to the user to urge the user to input a motive, so that the user replies a particular motive "when a message is received" (line 2) in his voice according to his intention. Thereafter, the motive-procedure set editing unit 45 retrieves a plurality of names of motives stored in the motive table storing unit 35 and delivers the motive names and the user's voice to the voice recognizing unit 46. The motive names are candidates for a sentence of a particular motive uttered as the user's voice. In this example, motive names "when a message is received", "at 0" o'clock every night" and "when a message volume exceeds a data base capacity" are delivered as candidates for a sentence (or a phrase) of a particular motive.

In general, though the accuracy of the voice recognition for an unspecified word or sentence uttered by a user is low, the accuracy of the voice recognition for a specified word or sentence uttered by a user is high. Therefore, because the motive names are delivered to the voice recognizing unit 46, the accuracy of the voice recognition for the user's voice is heightened. In this example, the voice of the particular motive "when a message is received" is correctly recognized, and the particular motive is sent to the motive-procedure set editing unit 45. In cases where the voice of the particular motive cannot be recognized as one of the candidates, the motive-procedure set editing unit 45 urges the user to again input a particular motive, and the recognition of the voice of the particular motive is repeated until the voice of the particular motive is correctly recognized. When the voice of the particular motive is recognized, a confirming sentence "when a message is received?" (line 3) is sent to the user, and the confirmation of the user "yes" (line 4) is received in the motive-procedure set editing unit 45.

Thereafter, a substance of the particular motive is retrieved from the motive table storing unit 35 in the motive-procedure set editing unit 45. Therefore, in this example, a substance of the particular motive "when a message is received" is recognized in the motive-procedure set editing unit 45, and the substance "when a message is received" is temporarily stored as the particular motive in the temporarily storing area of the message holding data base 21.

Thereafter, a voice recognition of a condition is performed. That is, a voiced guidance "what is a condition?" (line 5) is given to the user to urge the user to input a particular condition, so that the user replies a particular condition "inclusion" (line 6) in his voice according to his intention. Thereafter, the motive-procedure set editing unit 45 retrieves a plurality of names of conditions stored in the condition table storing unit 36 and delivers the condition names and the user's voice to the voice recognizing unit 46. The condition names are candidates for a sentence of a particular condition uttered as the user's voice. In this example, condition names "inclusion" and "agreement" are delivered as candidates for a particular condition. Therefore, the voice of the particular condition "inclusion" is recognized in the voice recognizing unit 46, and the confirmation of the particular condition is performed (lines 7 and 8).

Thereafter, the motive-procedure set editing unit 45 checks the number of arguments of the particular condition by referring the condition table storing unit 36. In cases where the number of arguments is one or more, an operation for setting arguments of the particular condition is performed. In this example, because the setting of two arguments is required for the particular condition, a voiced guidance "Inclusion is that a first argument includes a second argument. What is the first argument?" (line 9) is sent to the user, a voice of a reply "subject" (line 10) of the user is sent to the motive-procedure set editing unit 45, the confirmation of the reply is performed in the motive-procedure set editing unit 45 (lines 11 and 12), and candidates "subject" and "from" for the first argument are transmitted to the voice recognizing unit 46 with the voice of the reply "subject", and the first argument "subject" is recognized. In this case, because the first argument is an enumeration type, as shown in FIG. 22, it is preferred that a voiced guidance "Inclusion is that a first argument includes a second argument. What is the first argument? Please select the first argument from subject and from" be sent to the user. This idea that synthesized voices of candidates are uttered for the user can be adopted for the setting of a motive name, a condition name or a message processing procedure name.

Thereafter, the second argument is set. That is, a voiced guidance "What is the second argument?" (line 13) is sent to the user, a voice of a reply "urgent communication" (line 14) of the user is sent to the motive-procedure set editing unit 45, and the recognition of the voice "urgent communication" is confirmed (lines 15 and 16). Thereafter, because the second argument is a character string type, any candidate for the second argument is not sent to the voice recognizing unit 46, so that the voice "urgent communication" of an unspecified word is recognized in the voice recognizing unit 46 without any candidate.

In this case, because there are three expression types such as a kana expression, a chinese character expression and a katakana expression for each word in Japanese, as shown in FIG. 23, it is preferred that a voiced guidance for the conversion of the expression type be added. The conversion of the expression type for an argument of a character string type has a following merit. When a character written by a kana expression in a character string cannot be converted into a chinese character, there is a high probability that a voice the character string is erroneously recognized, so that the erroneous recognition of a voice of a character string can be judged in the motive-procedure set editing unit 45 in some degree. Therefore, it is preferred that a voiced guidance for again urging the user to input a voice is sent to the user when the motive-procedure set editing unit 45 fails in the conversion of the expression type.

Thereafter, because the first argument "subject" and the second argument "urgent communication" in the particular condition "inclusion" are recognized, a substance of the particular condition "inclusion (subject, "urgent communication")" is recognized in the motive-procedure set editing unit 45 by referring the condition table storing unit 36. Thereafter, the substance "inclusion (subject, "urgent communication")" is temporarily stored as the particular condition in the temporarily storing area of the message holding data base 21 under the control of the motive-procedure set editing unit 45.

Thereafter, a voice recognition of a message processing procedure is performed. That is, a voiced guidance "what is a message processing procedure?" (line 17) is given to the user to urge the user to input a particular message processing procedure, so that the user replies "notification" (line 18) in his voice as a particular message processing procedure according to his intention, and the recognition of the voice "notification" is confirmed (lines 19 and 20). Thereafter, the motive-procedure set editing unit 45 delivers the voice "notification" and candidates "transmission", "notification" and "deletion" for the particular message processing procedure to the voice recognizing unit 46, and the particular message processing procedure "notification" is recognized.

Thereafter, the motive-procedure set editing unit 45 checks the number of arguments of the particular message processing procedure by referring the message processing procedure table storing unit 37. In this example, because the setting of one argument is required for the particular message processing procedure, a voiced guidance "Notification is that the incoming of a message is notified to a first argument. What is the first argument?" (line 21) is sent to the user, a voice of a reply "pager" (line 22) of the user is sent to the motive-procedure set editing unit 45, the confirmation of the reply is performed in the motive-procedure set editing unit 45 (lines 23 and 24), candidates "pager", "home telephone", "portable telephone", "facsimile" and "electronic mail" for the first argument are transmitted to the voice recognizing unit 46 with the voice of the reply "pager", and the first argument "pager" is recognized.

Thereafter, because the first argument "pager" in the particular message processing procedure "notification" is recognized, a substance of the particular message processing procedure "notification (pager)" is recognized in the motive-procedure set editing unit 45 by referring the message processing procedure table storing unit 37. Thereafter, the substance "notification (pager)" is temporarily stored as the particular message processing procedure in the temporarily storing area of the message holding data base 21 under the control of the motive-procedure set editing unit 45.

In the setting of the particular message processing procedure, it is preferred that a voiced guidance in which names of message processing procedures are enumerated be given to the user before the user utters a name of a particular message processing procedure. Also, it is preferred that a voiced guidance in which candidates for the first argument are enumerated be given to the user before the user utters one candidate.

Thereafter, because the particular motive, the particular condition and the particular message processing procedure specified by the user as a particular motive-procedure set are recognized, a particular motive-procedure set "an incoming call of a message sent for the user is automatically transmitted to user's pager when a character string "urgent communication" is prepared from the particular motive, and the particular condition and the particular message processing procedure in the motive-procedure set editing unit 45, the confirmation of the particular motive-procedure set is performed (lines 25 and 26). Thereafter, the particular motive-procedure set is stored in a region allocated for the user in the motive-procedure set storing unit 22, and a voiced guidance informing that the edition of the particular motive-procedure set is completed is given to the user (line 27).

Accordingly, even though a user uses a telephone, a motive-procedure set reflecting user's intention can be easily set in the message switching apparatus 41 by performing a voice communication with the message switching apparatus.

Also, in cases where a user operates the personal computer 43 with a voice input-output unit, even though a user does not have a technical knowledge of a personal computer or a technical knowledge of a message switching apparatus, a motive-procedure set reflecting user's intention can be easily set in the message switching apparatus by performing a voice communication with the message switching apparatus. Also, any motive-procedure set possible to be set in the message switching apparatus 41 can be easily set by the user.

(Fourth Embodiment)

In a fourth embodiment, a series of message operations is performed by a user to manage a plurality of message sent for the user, one of the messages is processed according to the series of message operations, a motive-procedure set is automatically prepared according to the series of message operations, and the motive-procedure set is stored in the motive-procedure set storing unit 22.

Figure 24:
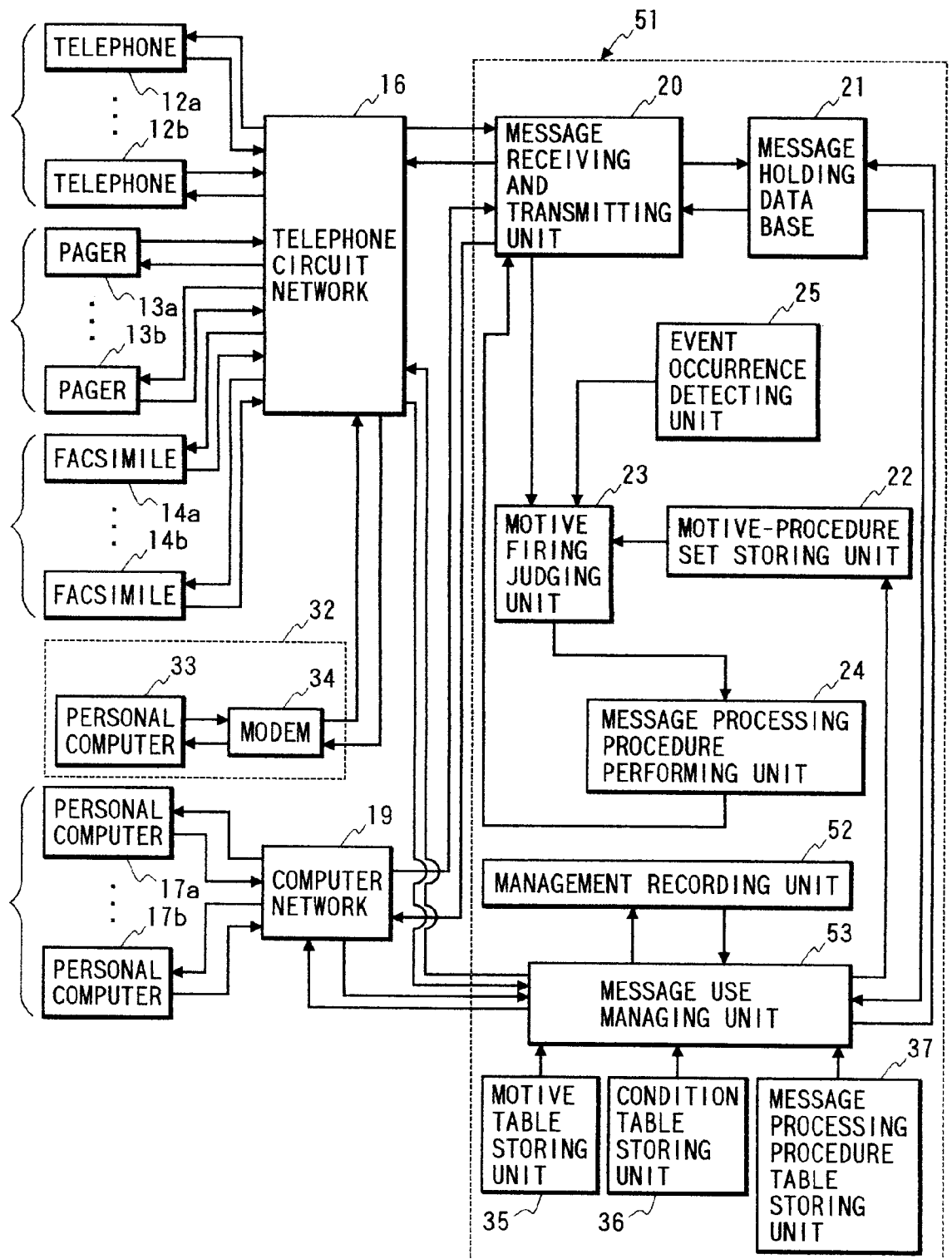
FIG. 24 is a block diagram of a message switching apparatus connected with a plurality of information terminals and a plurality of communication terminals according to a fourth embodiment of the present invention.

FIG. 24 is a block diagram of a message switching apparatus connected with a plurality of information terminals and a plurality of communication terminals according to a fourth embodiment of the present invention.

As shown in FIG. 24, a message switching apparatus 51 is connected with the plurality of telephones 12a and 12b, the plurality of pagers 13a and 13b, the plurality of facsimiles 14a and 14b and the plurality of personal computers 17a and 17b in the same manner as the message switching apparatus 11. In addition, the message switching apparatus 51 is connected with the computer system 32 through the telephone circuit network 16.

The message switching apparatus 51 comprises:
the message receiving and transmitting unit 20, the message holding data base 21, the motive-procedure set storing unit 22, the motive firing judging unit 23, the message processing procedure performing unit 24, the motive table storing unit 35, the condition table storing unit 36, the message processing procedure table storing unit 37,
a message use managing unit 52 having a graphical user interface (GUI) for displaying a message operation window on a image screen of an information terminal operated by a user, adding the displaying of a plurality of messages sent for the user through the message receiving and transmitting unit 20 to the message operation window, giving guidance information to the message operation window according to the motives, the conditions and the message processing procedures stored in the motive table storing unit 35, the condition table storing unit 36 and the message processing procedure table storing unit 37, receiving a particular condition from the user to select a particular message from the messages in reply to the guidance information, receiving a particular message processing procedure from the user in reply to the guidance information, processing the particular message according to the particular message processing procedure, receiving a particular motive from the user in reply to the guidance information, preparing a particular motive-procedure set from the particular condition, the particular message processing procedure and the particular motive, and storing the particular motive-procedure set in the motive-procedure set storing unit 22; and a management recording unit 53 for recording the particular condition and the particular message processing procedure received in the message use managing unit 52.

The message use managing unit 52 has a function as a server of a hypertext transfer protocol (HTTP). Therefore, when a user operating one personal computer 17a or 17b desires to edit a particular motive-procedure set, a client software installed in the personal computer is executed, a data communication between the personal computer and the message use managing unit 52 is performed at a Transmission Control Protocol (TCP), and the editing of the particular motive-procedure set is performed in the message use managing unit 52 according to an intention of the user while referring the motive table, the condition table and the message processing procedure table stored in the storing units 35, 36 and 37. The operation of the message use managing unit 52 is not limited to the TCP. For example, it is applicable that the Xwindow system or the Windows OS of the Microsoft Co. Ltd. be used to operate the message use managing unit 52.

Also, when a user operating the personal computer 33 desires to edit a particular motive-procedure set, a data communication between the personal computer 33 and the message use managing unit 52 through the telephone circuit network 16 is performed at a Point-to-Point Protocol (PPP).

Also, in message use managing unit 52, information stored in the motive table storing unit 35, the condition table storing unit 36 and the message processing procedure table storing unit 37 is given to a user by using the GUI, and a plurality of instructions are received from the user. However, this embodiment is not limited to the use of the GUI. For example, it is applicable that a user operate a character terminal and the operation of the message use managing unit 52 be performed by using a user interface of a character base.

In the above configuration, an operation of the message switching apparatus 51 is described.

When a user executes an HTTP client program installed in the personal computer 17a to communicate with the message use managing unit 52, a message operating window W1 is displayed on an image screen of the personal computer 17a under the control of the message use managing unit 52.

Figure 25:
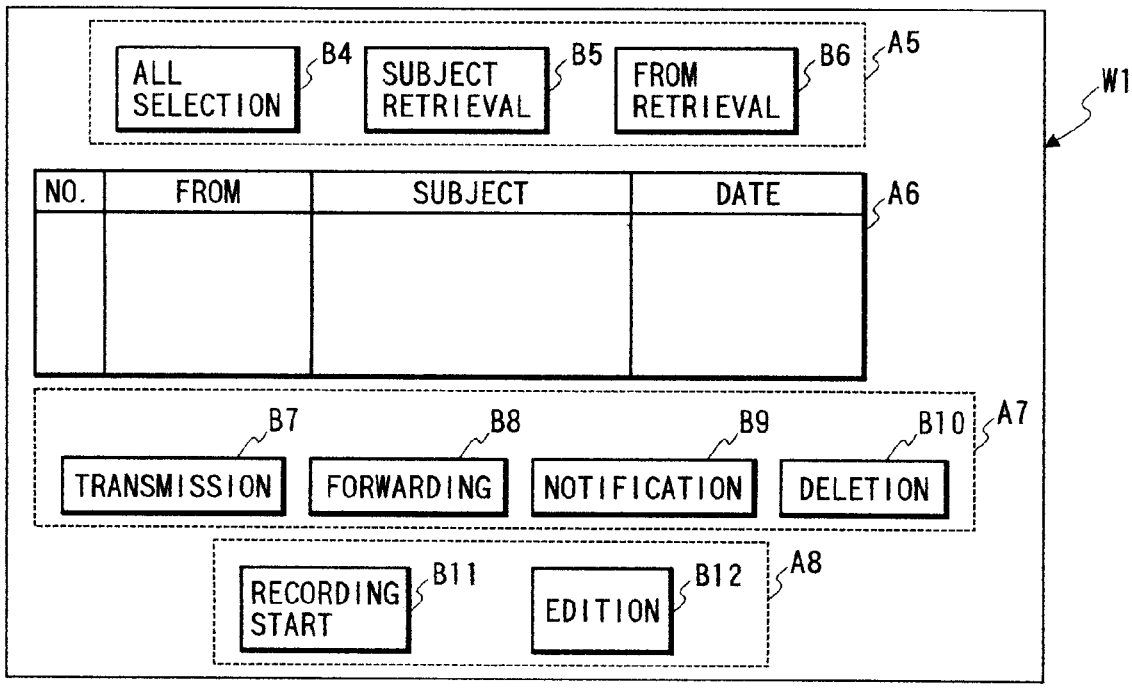
FIG. 25 shows a message operating window in which any message sent for a user is not displayed.
Figure 26:
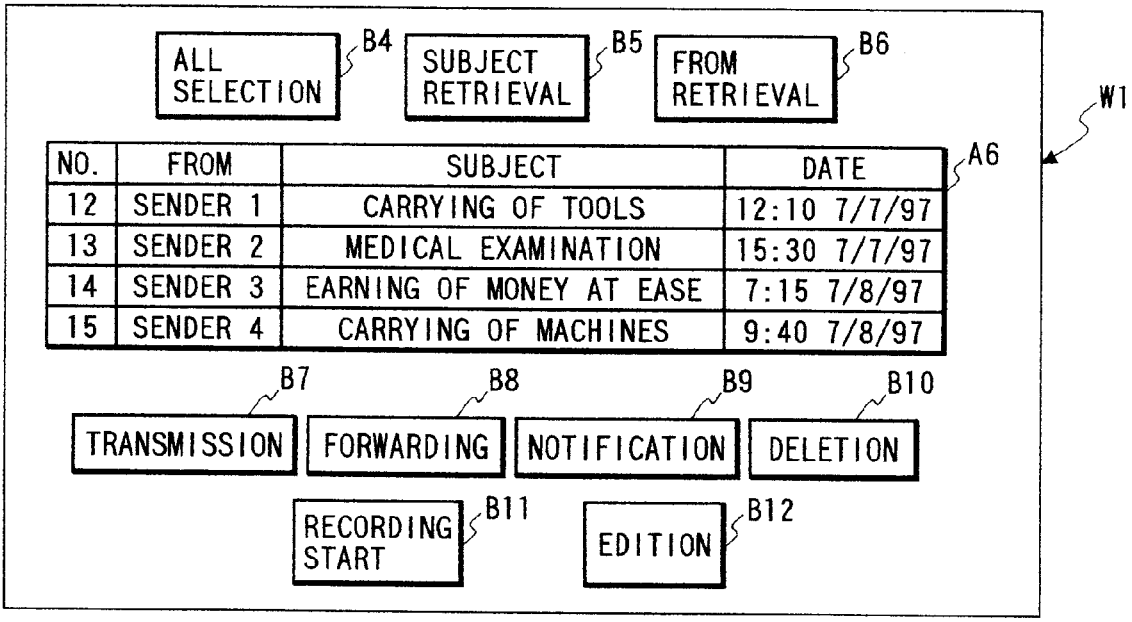
FIG. 26 shows a message operating window in which four messages sent for a user is displayed.

FIG. 25 shows a message operating window W1 in which any message sent for the user is not displayed, and FIG. 26 shows a message operating window W1 in which four messages sent for the user is displayed.

As shown in FIGS. 25 and 26, three buttons are displayed in a message selecting button display area A5. The first button is an all messages selection button B4 used to select all messages displayed in a message display area A6 of the message operating window W1. The second button is a first message selecting button B5 used to select a message in which contents of a subject satisfies a retrieval condition "inclusion (subject, $2)" or "agreement (subject, $2)". The third button is a second message selecting button B6 used to select a message in which a sender satisfies a retrieval condition "inclusion (from, $2)" or "agreement (from, $2)". When the first message selecting button B5 or the second message selecting button B6 is selected, a retrieval condition setting window is displayed on the image screen by referring the condition table storing unit 36, a name of the retrieval condition "inclusion" or "agreement" is selected by a user, a second argument "$2" of the retrieval condition is written by the user, and a substance of the retrieval condition is stored in the management recording unit 53 as a particular condition specified by the user.

Also, four buttons are displayed in a message processing procedure specifying area A7, and the message processing procedure table storing unit 37 is referred each time one of the buttons is selected. The first button is a transmission button B7 used to specify "transmission" as a particular message processing procedure, and a message selected by selecting one of the buttons B4 to B6 is transmitted to the user when the transmission button B7 is selected. The second button is a forwarding button B8 used to specify "forwarding" as a particular message processing procedure, and a message selected by selecting one of the buttons B4 to B6 is forwarded to the user when the forwarding button B8 is selected. The third button is a notification button B9 used to specify "notification" as a particular message processing procedure, and the incoming of a message selected by selecting one of the buttons B4 to B6 is notified to the user when the notification button B9 is selected. The fourth button is a deletion button B10 used to specify "deletion" as a particular message processing procedure, and a message selected by selecting one of the buttons B4 to B6 is deleted when the deletion button B10 is selected. When the transmission button B7 is selected, a pull-down menu (not shown) is displayed in the same manner as in the second embodiment to request the user to input a transmission address (or an argument of the "transmission"), so that a transmission address of the user can be specified. Also, when the forwarding button B8 or the notification button B9 is selected, a forwarding address or a notification address is specified by the user in the same manner. The particular message processing procedure is stored in the management recording unit 53.

Also, two buttons are displayed in a management recording control area A8. The first button is a recording start button B11 used to delete the recording stored in the management recording unit 53. The second button is a motive-procedure set editing button B12 used to read out all the recording (for example, the particular condition and the particular message processing procedure) stored in the management recording unit 53, receive a particular motive from the user, prepare a particular motive-procedure set from the particular motive, the particular condition and the particular message processing procedure and store the particular motive-procedure set in a user's region of the motive-procedure set storing unit 22.

In cases where four messages for the user are stored in the message holding data base 21, as shown in FIG. 26, the messages are displayed in the message display area A6 of the message operating window W1. In the message display area A6, the number of the message, a name of a sender, contents of a subject and a date arrived at the message switching apparatus 51 are displayed for each message.

In cases where the user has an intention that the user desires to delete a message sent from a sender 3 when the message is received, the deletion of the message sent from the sender 3 and the editing of a particular motive-procedure set are performed according to the user's intention as follows.

The user initially selects the recording start button B11, and the recording stored in the management recording unit 53 is deleted.

Figure 27:
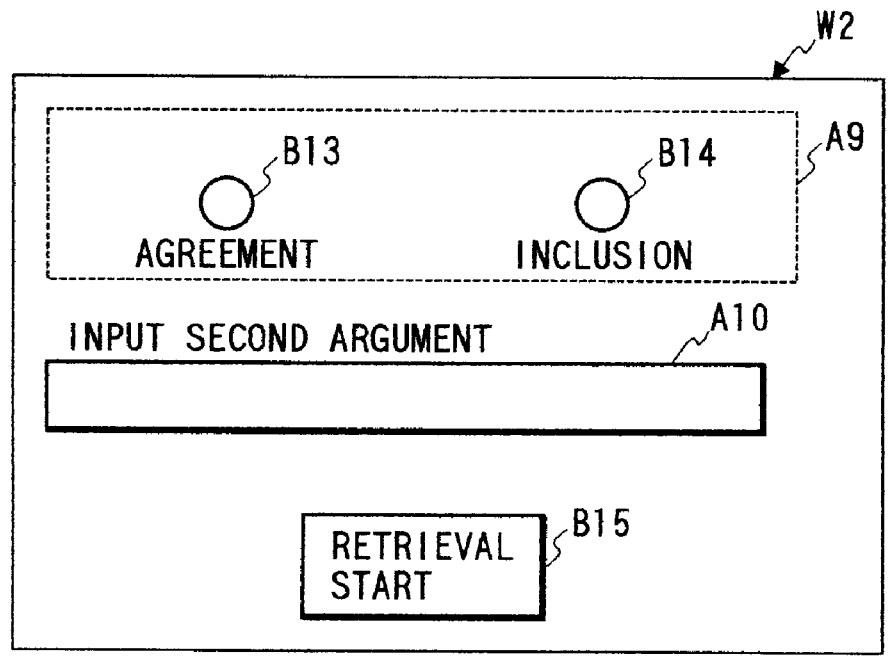
FIG. 27 shows a retrieval condition setting window used to set a retrieval condition.
Figure 28:
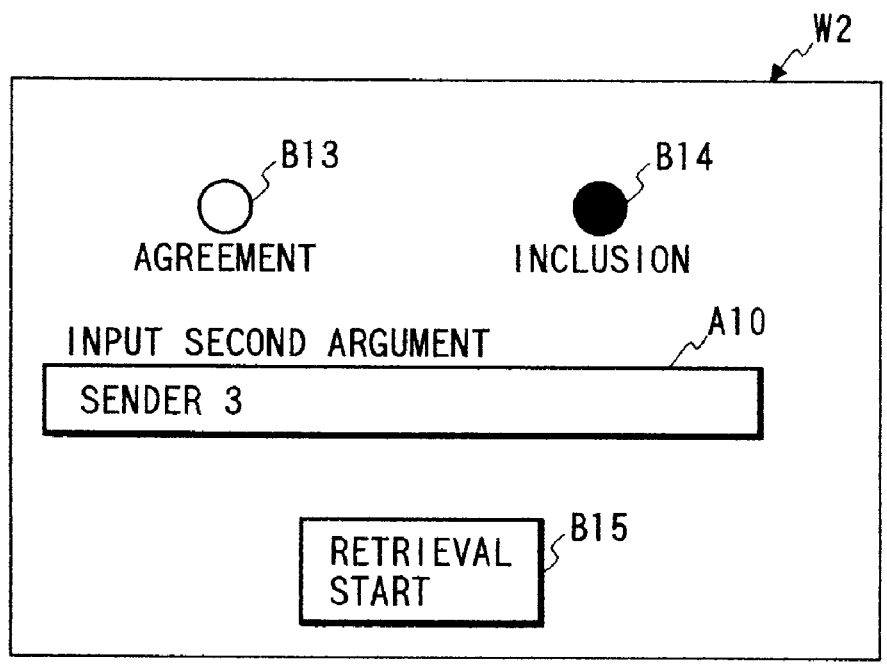
FIG. 28 shows a retrieval condition setting window in which a retrieval condition has been already set.

Thereafter, the user selects all messages of the sender 3. In detail, because the user desires to select all messages of the sender 3, the user selects the second message selecting button B6, and a retrieval condition setting window W2 shown in FIG. 27 is displayed on the image screen under the control of the message use managing unit 52 by referring to the condition table storing unit 36. In the retrieval condition setting window W2, an agreement selecting button B13 and an inclusion selecting button B14 are displayed in a selection area A9, a retrieval start button B15 is displayed, and a character string input area A10 is arranged to input a character string as a second argument of a retrieval condition. When the user selects the inclusion selecting button B14 and writes "sender 3" in the character string input area A10 to set a particular condition "inclusion (from, sender 3)", and the user selects the retrieval start button B15. Therefore, as shown in FIG. 28, the setting of the particular condition "inclusion (from, sender 3)" is displayed, and the particular condition "inclusion (from, sender 3)" is recognized by the message use managing unit 52. Thereafter, one or more messages satisfying the particular condition "inclusion (from, sender 3)" are retrieved from the messages displayed in the message display area A6 by the message use managing unit 52. Because a particular message of the message No. 14 satisfies the particular condition "inclusion (from, sender 3)", as shown in FIG. 29, a reversing display is performed for the particular message displayed in the message display area A6, and the particular message is recorded in the management recording unit 53. At this time, a recording condition of the particular message is shown in FIG. 30.

Thereafter, because the user desires the deletion of the particular message, the user selects the deletion button B10. Therefore, the particular message is deleted from the messages displayed in the message display area A6, and the particular message stored in the message holding data base 21 is deleted. Because a particular message processing procedure "deletion" is performed, the particular message processing procedure "deletion" is recorded in the management recording unit 53. At this time, a recording condition of the particular message is shown in FIG. 31.

Figure 32:
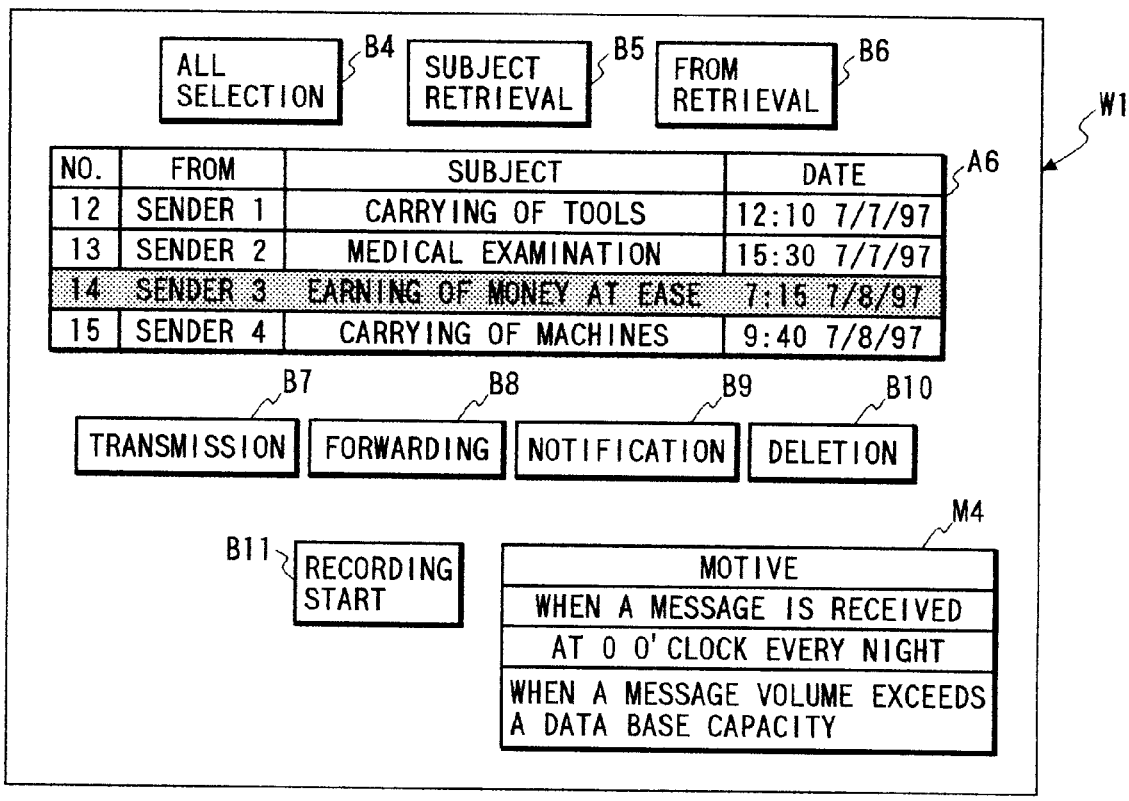
FIG. 32 shows a retrieval condition setting window in which a plurality of candidates for a motive are shown.
Figure 33:
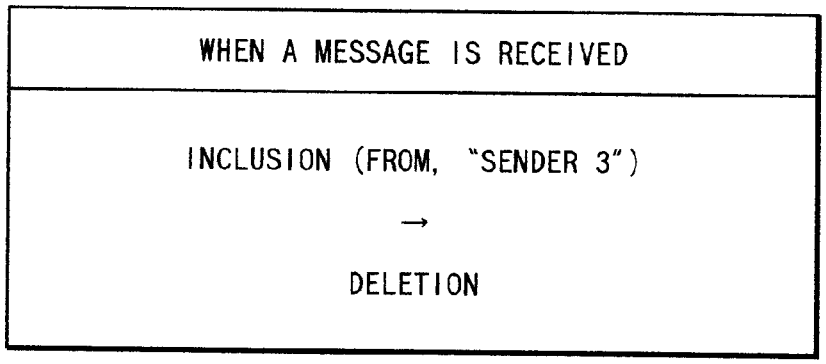
FIG. 33 shows an example of a motive-procedure set prepared in a message using and managing unit shown in FIG. 24.

Thereafter, because the deletion of the particular message is completed, a particular motive-procedure set corresponding to the user is prepared. In detail, the user selects the motive-procedure set editing button B12. The selection of the button B12 is detected by the message use managing unit 52, and all the recording of the management recording unit 53 is read out to the message use managing unit 52. The recording is shown in FIG. 31. Also, as shown in FIG. 32, a pull-down menu M4, in which names of motives stored in the motive table storing unit 35 are displayed when the button B12 is selected. Because the user desires to delete a message sent for the user when the message is received in the message switching apparatus 51, the user selects a particular motive "when the message is received", and the selection of the particular motive is detected by the message use managing unit 52. Therefore, the setting of the particular motive, the particular condition and the particular message processing procedure is completed, and a particular motive-procedure set corresponding to the user is prepared from the particular motive, the particular condition and the particular message processing procedure and is stored in a user's region of the motive-procedure set storing unit 22. The particular motive-procedure set is shown in FIG. 33.

Therefore, because the particular motive-procedure set corresponding to the user is stored in the motive-procedure set storing unit 22, when a message sent from the sender 3 to the user is received in the message switching apparatus 51, the message is automatically deleted according to the particular motive-procedure set.

Accordingly, a user can easily prepare a motive-procedure set by generalizing a series of specific operations required to manage one of messages sent for the user, and another message sent for the user can be processed according to the motive-procedure set. Therefore, the preparation of the motive-procedure set can be efficiently performed by utilizing the specific operations required for the management of messages.

(Fifth Embodiment)

In a fifth embodiment, a managing operation, in which a particular condition and a particular message processing procedure in the same manner as in the fourth embodiment, a particular message satisfying the particular condition is selected from a plurality of messages sent for a user, the particular message is processed according to the particular message processing procedure and a particular message processing procedure with condition is prepared from the particular condition and the particular message processing procedure, is repeatedly performed, the frequency of the managing operations performed for preparing the same particular message processing procedure with condition is counted, and a motive-procedure set is prepared from the particular message processing procedure and a particular motive and is stored in a motive-procedure set storing unit in cases where the frequency of the managing operations for the particular message processing procedure with condition exceeds a frequency threshold value.

Figure 34:
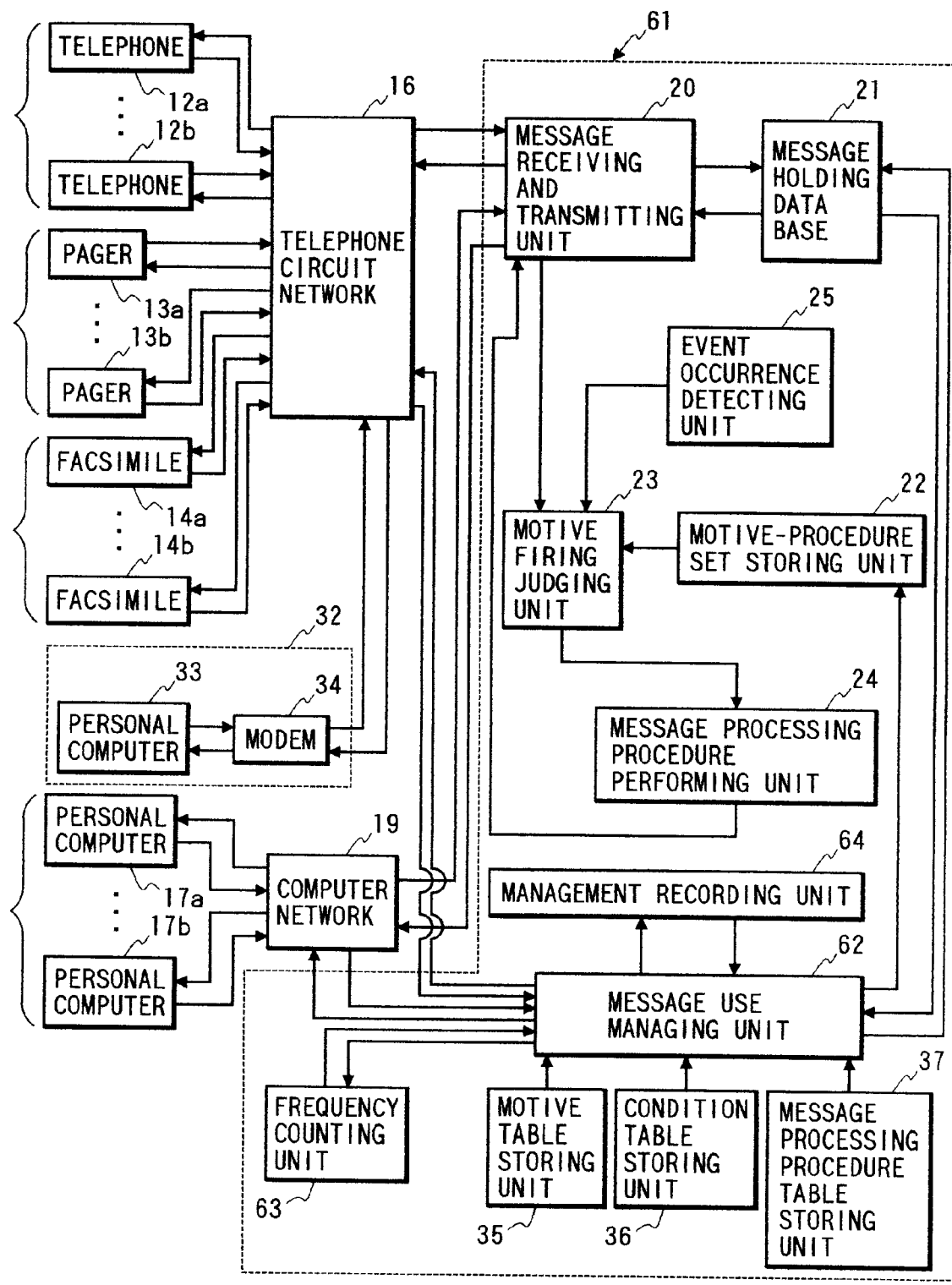
FIG. 34 is a block diagram of a message switching apparatus connected with a plurality of information terminals and a plurality of communication terminals according to a fifth embodiment of the present invention.

FIG. 34 is a block diagram of a message switching apparatus connected with a plurality of information terminals and a plurality of communication terminals according to a fifth embodiment of the present invention.

As shown in FIG. 34, a message switching apparatus 61 is connected with the plurality of telephones 12a and 12b, the plurality of pagers 13a and 13b, the plurality of facsimiles 14a and 14b and the plurality of personal computers 17a and 17b in the same manner as the message switching apparatus 11. In addition, the message switching apparatus 61 is connected with the computer system 32 through the telephone circuit network 16.

The message switching apparatus 61 comprises:
the message receiving and transmitting unit 20, the message holding data base 21, the motive-procedure set storing unit 22, the motive firing judging unit 23, the message processing procedure performing unit 24, the motive table storing unit 35, the condition table storing unit 36, the message processing procedure table storing unit 37,
a message use managing unit 62 having a graphical user interface (GUI) for displaying a message operation window on a image screen of an information terminal operated by a user, adding the displaying of a plurality of messages sent for the user through the message receiving and transmitting unit 20 to the message operation window, giving guidance information to the message operation window according to the motives, the conditions and the message processing procedures stored in the motive table storing unit 35, the condition table storing unit 36 and the message processing procedure table storing unit 37, receiving a particular condition from the user to select a particular message from the messages in reply to the guidance information, receiving a particular message processing procedure from the user in reply to the guidance information, processing the particular message according to the particular message processing procedure, preparing a particular message processing procedure with condition from the particular condition and the particular message processing procedure, receiving a particular motive from the user in reply to the guidance information in cases where the frequency of operations for respectively preparing the same particular message processing procedure with condition exceeds a frequency threshold value, preparing a particular motive-procedure set from the particular message processing procedure with condition and the particular motive, and storing the particular motive-procedure set in the motive-procedure set storing unit 22;

a frequency counting unit 63 for counting the frequency of operations respectively performed in the message use managing unit 62 to prepare the same particular message processing procedure with condition; and a management recording unit 64 for recording the particular message processing procedure with condition prepared in the message use managing unit 62 in cases where the particular message processing procedure with condition is prepared for the first time, and recording the frequency counted by the frequency counting unit 63 for the particular message processing procedure with condition.

In the above configuration, an operation of the message switching apparatus 61 is described.

Figure 35:
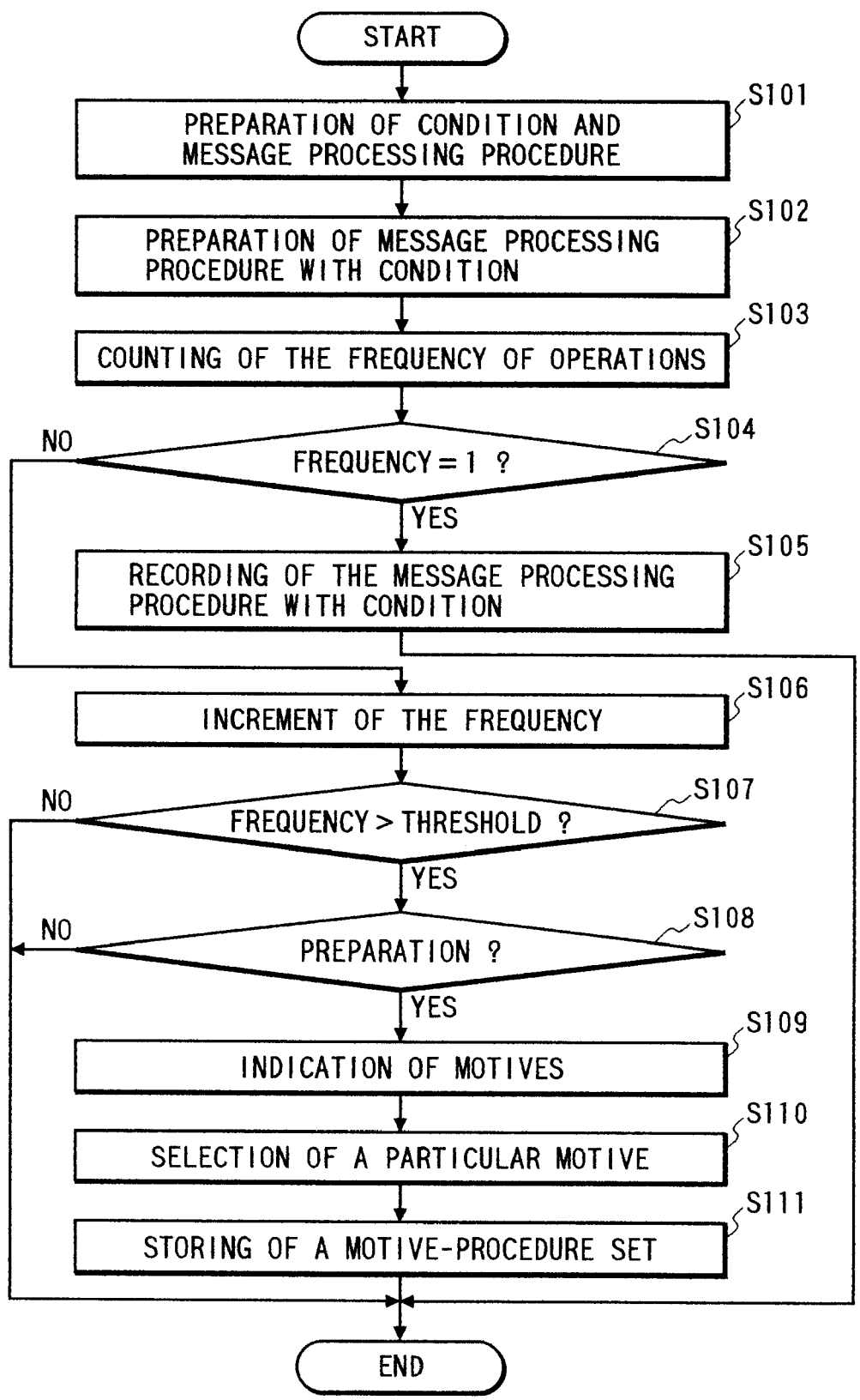
FIG. 35 is a flow chart showing the procedure of an operation of the message switching apparatus shown in FIG. 34 according to the fifth embodiment.

FIG. 35 is a flow chart showing the procedure of an operation of the message switching apparatus 61 according to the fifth embodiment.

When a user executes an HTTP client program installed in the personal computer 17a to communicate with the message use managing unit 62, a particular condition and a particular message processing procedure are prepared in the same manner as in the fourth embodiment (step S101). Thereafter, a particular message processing procedure with condition is prepared in the message use managing unit 62 by combining the particular condition and the particular message processing procedure in the same manner as in the first embodiment (step S102). The frequency of operations respectively performed in the message use managing unit 62 to prepare the same particular message processing procedure with condition is counted by the frequency counting unit 63 (step S103). Thereafter, it is judged by the message use managing unit 62 whether or not the particular message processing procedure with condition is prepared for the first time (step S104).

In cases where the frequency is one, because the particular message processing procedure with condition is prepared for the first time, the particular message processing procedure with condition is recorded in the management recording unit 64, and the frequency of operations performed for the particular message processing procedure with condition is set to one in the management recording unit 64 (step S105).

In contrast, in cases where the particular message processing procedure with condition is prepared many times in the message use managing unit 62, because the particular message processing procedure with condition has been already recorded in the management recording unit 64, the frequency for the particular message processing procedure with condition is incremented by one in the management recording unit 64 (step S106).

FIG. 36 shows an example of a table of a plurality of message processing procedures with conditions and frequencies recorded in the management recording unit 64. As shown in FIG. 36, the frequency for a message processing procedure with condition (No. 1) composed of a condition "inclusion (from, sender 3)" and a message processing procedure "deletion ()" is set to five. The frequency indicates that the preparation of the message processing procedure with condition (No. 1) was repeated five times in previous operations. Therefore, because the particular message processing procedure with condition prepared in the step S103 agrees with the message processing procedure with condition (No. 1) in this example, the frequency is incremented to six. Thereafter, it is judged by the message use managing unit 62 whether or not the frequency for the particular message processing procedure with condition recorded in the management recording unit 64 exceeds a particular frequency threshold value (step S107). In cases where the frequency for the particular message processing procedure with condition does not exceed the particular frequency threshold value, the operation of the message switching apparatus 61 is stopped. In contrast, in cases where the frequency for the particular message processing procedure with condition exceeds the particular frequency threshold value, the message use managing unit 62 asks the user whether or not a particular motive-procedure set corresponding to the particular message processing procedure with condition is prepared and stored in the motive-procedure set storing unit 22 (step S108).

Figure 37:
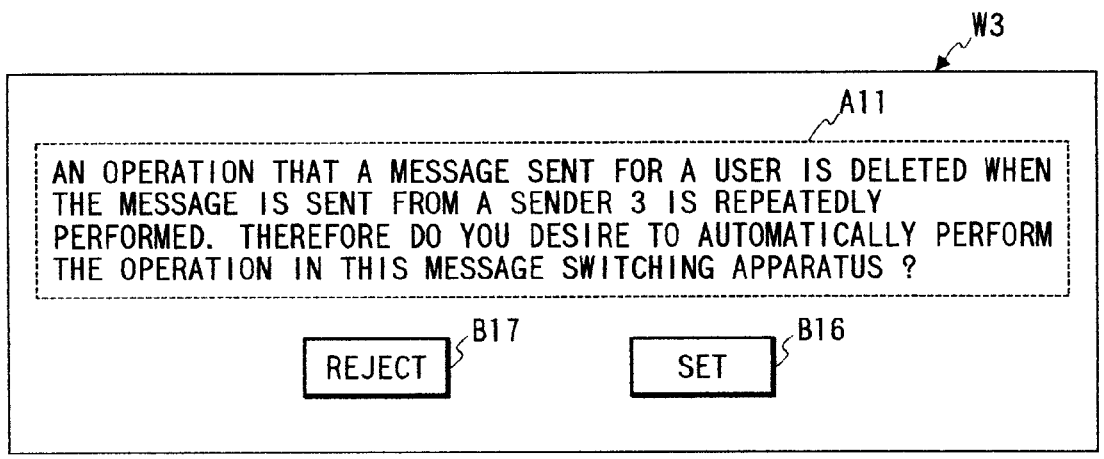
FIG. 37 shows an example of a motive-procedure set preparation asking window shown for a user.

In this example, because the particular frequency threshold value is set to five, the frequency for the particular message processing procedure with condition exceeds the particular frequency threshold value, so that the message processing procedure with condition (No. 1) is retrieved by the message use managing unit 62, and a motive-procedure set preparation asking window W3 shown in FIG. 37 is displayed on an image screen of the personal computer 17a of the user. In the window W3, an asking message "an operation that a message sent for a user is deleted when the message is sent from a sender 3 is repeatedly performed. Therefore, do you desire to automatically perform the operation in this message switching apparatus?" is displayed in an asking message area A11, and an automatic operation setting button B16 and an automatic operation rejecting button B17 are displayed. When the user selects the button B17, the automatic operation for deleting a message sent from the sender 3 is rejected, and the operation of the message switching apparatus 61 is stopped.

In cases where the user replies that he desires to store the particular motive-procedure set in the motive-procedure set storing unit 22, a pull-down menu of a plurality of motives stored in the motive table storing unit 35 is indicated to the user under the control of the message use managing unit 62 (step S109). When the user selects a particular motive from the pull-down menu (step S110), a particular motive-procedure set is automatically prepared from the particular motive and the particular message processing procedure with condition and is stored in the motive-procedure set storing unit 22 (step S111).

Figure 38:
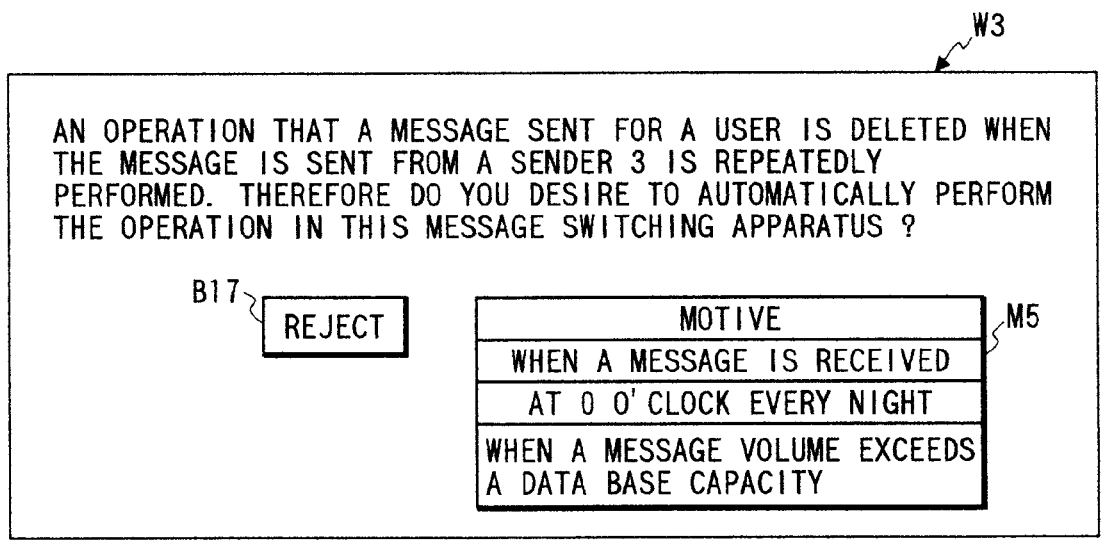
FIG. 38 shows the selection of a motive from a pull-down menu indicated in the motive-procedure set preparation asking window.

In this example, as shown in FIG. 38, when the user desires to store the particular motive-procedure set in the motive-procedure set storing unit 22, the user selects the automatic operation setting button B16, and a pull-down menu M5 is opened. When the user selects a particular motive "when a message is received", the particular motive-procedure set shown in FIG. 33 is automatically prepared and is stored in a user's region of the motive-procedure set storing unit 22.

Accordingly, in cases where an operation corresponding to a particular message processing procedure with condition is performed many times, the user can set an automatic operation for the particular message processing procedure with condition. Also, because the pull-down menu M5 is displayed for the user, the user can easily perform the setting of the automatic operation even though the user does not have a technical knowledge of a personal computer or a technical knowledge of a message switching apparatus.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A flexible and customizable message switching apparatus, comprising:

motive-procedure set storing means for storing a plurality of motive-procedure sets, each motive-procedure set comprising a motive and a message processing procedure with a condition, wherein the motive is adapted to detect:
an event occurring in association with the message switching,
an occurrence of the event firing the motive, wherein the message processing procedure with a condition comprises both a message processing procedure to be performed on a message and the condition that allows the message processing procedure to be performed if the message satisfies the condition, and wherein contents of the motive, the condition, and the message processing procedure are set independently from each other so as to arbitrarily distribute their contents among the motive, the condition, and the message processing procedure;

message receiving means for receiving, from a sender's communication terminal or information terminal, a particular message and a destination address of a receiver receiving the particular message;

motive firing judging means for:
identifying the receiver being addressed in the particular message,
retrieving a plurality of specific sub set of motive-procedure sets corresponding to the identified receiver from the plurality of motive-procedure sets,
identifying a plurality of specific motives corresponding to the specific sub set of motive-procedure sets,
detecting the occurrence of a particular event expressing a particular motive from among the specific motives, and
selecting a particular motive-procedure set corresponding to the particular motive from the sub set plurality of specific motive-procedure sets, and determining whether the particular motive has been fired or not; and message processing procedure performing means for performing a particular message processing procedure with a particular condition of the particular motive-procedure set in cases where the motive firing judging means judges that the particular motive has been fired and the particular condition has been satisfied by the particular message.

2. A message switching apparatus of claim 1, further comprising:

message transmitting means for transmitting a particular message to a receiver's communication terminal or information terminal indicated by the destination address of the receiver in cases where the particular message processing performed by the message processing procedure performing means indicates transmission of the particular message to the receiver.

3. A message switching apparatus according to claim 2 in which the sender's communication terminal is selected from the group consisting of a telephone, a pager and a facsimile.

4. A message switching apparatus according to claim 2 in which the sender's information terminal is a computer.

5. A message switching apparatus according to claim 2 in which one message processing procedure corresponding to each motive-procedure set stored in the motive-procedure set storing means denotes the transmission of a message to the destination address of the receiver.

6. A message switching apparatus according to claim 2 in which one motive corresponding to each motive-procedure set stored in the motive-procedure set storing means is expressed by an event relating to an operation of a message.

7. A message switching apparatus according to claim 2 in which one condition corresponding to each motive-procedure set stored in the motive-procedure set storing means is a general function.

8. A message switching apparatus according to claim 7 in which one condition corresponding to each motive-procedure set stored in the motive-procedure set storing means is a function for judging agreement.

9. A message switching apparatus according to claim 7 in which one condition corresponding to each motive-procedure set stored in the motive-procedure set storing means is a function for judging an inclusion.

10. A message switching apparatus according to claim 7 in which one condition corresponding to each motive-procedure set stored in the motive-procedure set storing means is a function for judging a greater or lesser relationship.

11. A message switching apparatus according to claim 2 in which one condition corresponding to each motive procedure set stored in the motive-procedure set storing means is expressed by a predicate logical equation.

12. A message switching apparatus according to claim 2 further comprising:

motive table storing means for storing a plurality of motives;

condition table storing means for storing a plurality of conditions;

message processing procedure table storing means for storing a plurality of message processing procedures; and motive-procedure set editing means for controlling an information terminal operated by a user to graphically display the motives stored in the motive table storing means on an image screen of the information terminal, wherein said editing means is adapted to:
instruct the user to select a desired motive from among the motives according to an intention of the user,
control the information terminal to graphically display the conditions stored in the condition table storing means on the image screen of the information terminal, instruct the user to select a desired condition from among the conditions according to the intention of the user, control the information terminal to graphically display the message processing procedure stored in the message processing procedure table storing means on the image screen of the information terminal, instruct the user to select a desired message processing procedure from among the message processing procedures according to the intention of the user, create a user desired motive procedure set by combining the motive, the condition and the message processing procedure selected by the user, store the user created motive procedure set in the motive-procedure set storing means in cases where the user desires to process any message sent for the user according to that motive-procedure set, and delete the user created motive-procedure set from the motive-procedure set storing means in cases where the user desires to delete that motive-procedure set.

13. A message switching apparatus according to claim 12 in which each motive stored in the motive table storing means comprises a name of the motive and a substance of the motive, and the substance of the desired motive is stored as an element of the desired motive-procedure set in the motive-procedure set storing means under the control of the graphical user interface editing means when the user selects the name of the desired motive.

14. A message switching apparatus according to claim 12 in which each message processing procedure stored in the message processing procedure table storing means comprises a name of the message processing procedure, a language expression of the message processing procedure including a space for an argument, a type of the argument and a substance of the message processing procedure, wherein a language expression of the desired message processing procedure is displayed on the image screen when the user selects the name of the desired message processing procedure, and the substance of the desired message processing procedure is stored as an element of the desired motive-procedure set in the motive-procedure set storing means under the control of the graphical user interface editing means when the user inputs a particular argument in the space of the language expression displayed on the image screen by referring the type of the particular argument.

15. A message switching apparatus according to claim 12 in which each condition stored in the condition table storing means comprises a name of the condition, a language expression of the condition including a space for an argument, a type of the argument and a substance of the condition, wherein a language expression of the desired condition is displayed on the image screen when the user selects the name of the desired condition, and the substance of the desired condition is stored as an element of the desired motive-procedure set in the motive procedure set storing means under the control of the graphical user interface editing means when the user inputs a particular argument in the space of the language expression displayed on the image screen by referring the type of the particular argument.

16. A message switching apparatus according to claim 2 in which the judgement whether or not the particular condition is satisfied is performed by the message processing procedure performing means according to contents of the particular message.

17. A message switching apparatus according to claim 2 further comprising:

voice recognition means for recognizing a user's voice and converting the user's voice into a natural language character string; and motive-procedure set editing means, for giving voiced guidance to a user operating a communications terminal or an information terminal, wherein said editing means is adapted to:

receive a voiced instruction of the user produced in reply to the voiced guidance, transmit the voiced instruction of the user to the voice recognition means to obtain a particular natural language character string corresponding to the voiced instructions of the user from the voice recognition means, edit a user's motive-procedure set corresponding to the user according to the particular natural language character string, store the motive-procedure set corresponding to the user in the motive-procedure set storing means in cases where the editing of the user's motive-procedure set denotes a new preparation, and delete the motive-procedure corresponding to the user from the motive-procedure set storing means in cases where the editing of the user's motive-procedure set denoted a deletion.

18. A message switching apparatus according to claim 2, further comprising:

motive table storing means adapted to store a plurality of motives;

condition table storing means adapted to store a plurality of conditions;

message processing procedure table storing means adapted to store a plurality of message processing procedures;

voice recognizing means for recognizing a user's voice and converting the user's voice to a natural language character string; and motive procedure set editing means adapted to:

give voiced guidance to a user operating a communication terminal or an information terminal, receive voiced instruction from the user produced in reply to the voiced guidance, transmit the voiced instructions of the user to the voice recognition means to obtain a particular natural language character string corresponding to the voiced instructions of the user from the voice recognizing means, select a desired motive from the motives stored in the motive table storing means according to the natural language character string, select a desired condition from the conditions stored in the condition table storing means according to the particular natural language character string, select a desired message processing procedure from the message processing procedures stored in the message processing procedure table storing means according to the particular natural language character string, prepare a desired motive procedure set corresponding to user according to the desired motive, the desired condition and the desired message processing procedure, and store the desired motive-procedure set corresponding to the user in the motive-procedure set storing means.

19. A message switching apparatus according to claim 2, further comprising:
  motive table storing means for storing a plurality of motives;
  condition table storing means for storing a plurality of conditions;
  message processing procedure table storing means for storing a plurality of message processing procedures;
  voice recognition means for recognizing a user's voice and converting the user's voice into a natural language character string; and
  motive-procedure set editing means adapted to:
    give a first voiced guidance indicating the motives stored in the motive table storing means as candidates for a desired motive to a user operating a communication terminal or an information terminal,
    receive the desired motive uttered by voice of the user in reply to the first voiced guidance,
    transmit the voiced desired motive to the voice recognition means to obtain a first natural language character string corresponding to the voice of the desired motive, from the voice recognition means,
    give a second voiced guidance indicating the conditions stored in the condition table storing means as candidates for a desired condition to the user,
    receive the voiced desired condition uttered by the user in reply to the second voiced guidance,
    transmit the voiced desired condition to the voice recognition means to obtain a second natural language character string, corresponding to the voiced desired condition, from the voice recognition means,
    give a third voiced guidance, indicating the message processing procedures stored in the message processing procedure table storing means as candidates for a desired message processing procedure, to the user,
    receive the voiced desired message processing procedure uttered by the user in reply to the third voiced guidance,
    transmit the voiced desired message processing procedure to the voice recognition means to obtain a third natural language character string corresponding to the voiced desired message processing procedure from the voice recognition means,
    prepare a desired motive-procedure set, corresponding to the user according to the first natural language character string and the third natural language character string, and
    store the desired motive-procedure set corresponding to the user in the motive-procedure set storing means.

20. A message switching apparatus according to claim 2 further comprising:
  message managing means for controlling an information terminal operated by a user to graphically display a plurality of messages received in the message receiving means and a plurality of condition candidates for a desired condition on an image screen of the information terminal,
  wherein said apparatus is adapted to:
    receive the desired condition selected by the user from the condition candidates, select a specific message from the messages according to the desired condition,
    control the information terminal to graphically display a plurality of procedure candidates for a desired message processing procedure on the image screen of the information terminal,
    process the specific message according to a message processing procedure selected by the user from the procedure candidates,
    control the information terminal to graphically display a plurality of motive candidates for a desired motive on the image screen of the information terminal,
    prepare a motive-procedure set from the condition, the message processing procedure and the motive selected by the user, and
    store the desired motive-procedure set in the motive-procedure set storing means.

21. A message switching apparatus according to claim 2, further comprising:
  management recording means for recording a management performed for a message; and
  message managing means adapted to control an information terminal operated by a user to graphically display a plurality of messages received in the message receiving means and a plurality of condition candidates for a desired condition on an image screen of the information terminal,
  wherein said apparatus is further adapted to:
    receive the desired condition selected by the user from the condition candidates,
    select a specific message from the messages according to the desired condition in the management recording means,
    control the information terminal to graphically display a plurality of procedure candidates for a desired message processing procedure on the image screen of the information terminal,
    process the specific message according to the desired message processing procedure selected by the user from the procedure candidates,
    store the desired message processing procedure in the management recording means,
    control the information terminal to graphically display a plurality of motive candidates for a desired motive on the image screen of the information terminal,
    read out the desired conditions and the desired message processing procedure from the management recording means, receiving the desired motive selected by the user,
    prepare a desired motive-procedure set from the desired condition, the desired message processing procedure and the desired motive, and
    store the desired motive-procedure set in the motive procedure set storing means.

22. A message switching apparatus according to claim 2, further comprising
  motive table storing means adapted to store a plurality of motives;
  condition table storing means adapted to store a plurality of conditions;
  message processing procedure table storing means adapted to store a plurality of message processing procedures; and
  message managing means adapted to:
    control an information terminal operated by a user to graphically display a plurality of messages received in the message receiving means on an image screen of the information terminal,
    control the information terminal to graphically display the conditions stored in the condition table storing means as candidates on the image screen of the information terminal, receive a desired condition selected by the user from the conditions,
select a specific message from the messages according to the desired condition,
control the information terminal to graphically display the message processing procedures stored in the message processing procedure table storing means as candidates on the image screen of the information terminal,
receive a desired message processing procedure selected by the user from the message processing procedures,
process the specific message according to the desired message processing procedure,
control the information terminal to graphically display the motives stored in the motive table storing means as candidates on the image screen of the information terminal,
receive a desired motive selected by the user from the motives,
prepare a desired motive-procedure set from the desired condition, the desired message processing procedure and the desired motive, and
store the desired motive-procedure set in the motive-procedure set storing means.

23. A message switching apparatus according to claim 2, further comprising:
message managing means adapted to repeatedly perform a managing operation whereby enabling a user of said information terminal to control said information terminal to graphically display a plurality of messages received in the message receiving means and a plurality of condition candidates for a desired condition on an image screen of the information terminal,
wherein said message managing means is further adapted to:
receive the desired condition selected by the user from the condition candidates,
select a specific message from the messages according to the selected condition,
control the information terminal to graphically display a plurality of procedure candidates for a desired message processing procedure on the image screen of the information terminal,
process the specific message according to the message processing procedure selected by the user from the procedure candidates and a desired message processing procedure with condition prepared from the desired condition and the desired message processing procedure,
control the information terminal to graphically display a plurality of motive candidates for a desired motive on the image screen of the information terminal in cases where the frequency of the managing operations performed to prepare the desired message processing procedure with condition exceeds a frequency threshold value,
prepare a desired motive-procedure set from the desired condition, the desired message processing procedure and the desired motive selected by the user, and
store the desired motive-procedure set in the motive-procedure set storing means.

24. A message switching apparatus according to claim 23, further comprising:
frequency counting means for counting the frequency of the managing operations performed by the message managing means to prepare the same desired message processing procedure with condition, the frequency counting means informing the message managing means of the frequency of the managing operations.

25. A message switching apparatus according to claim 2, further comprising:
motive table storing means adapted to store a plurality of motives;
condition table storing means adapted to store a plurality of conditions;
message processing procedure table storing means adapted to store a plurality of message processing procedures; and
message managing means adapted to repeatedly perform a managing operation including:
means for controlling an information terminal operated by a user to graphically display a plurality of messages received in the message receiving means and the conditions stored in the condition table storing means as candidates for a desired condition on an image screen of the information terminal,
means for receiving a desired condition selected by the user from the conditions,
means for selecting a specific message from the messages according to the desired condition,
means for controlling the information terminal to graphically display the message processing procedures stored in the message processing procedure table storing means as candidates for a desired message processing procedure on the image screen of the information terminal,
means for processing the specific message according to the desired message processing procedure selected by the user from the message processing procedures and
means for selecting a desired message processing procedure with condition from the desired condition and the desired message processing procedure,
means for controlling the information terminal to graphically display the motives stored in the motive table storing means as candidates for a desired motive on the image screen of the information terminal in cases where the frequency of the managing operations performed to prepare the desired message processing procedure with condition exceeds a frequency threshold value,
means for preparing a desired motive-procedure set from the desired condition, the desired message processing procedure and the desired motive selected by the user, and
means for storing the desired motive-procedure set in the motive-procedure set storing means.

26. A message switching apparatus according to claim 1 in which the receiver's communication terminal is selected from the group consisting of a telephone, a pager and a facsimile.

27. A message switching apparatus according to claim 1 in which one message processing procedure corresponding to each motive-procedure set stored in the motive-procedure set storing means denotes data conversion.

28. A message switching apparatus according to claim 27 in which one message processing procedure corresponding to each motive-procedure set stored in the motive-procedure set storing means denotes the conversion of a text message to an image message.

29. A message switching apparatus according to claim 27 in which one message processing procedure corresponding to each motive-procedure set stored in the motive-procedure set storing means denotes the compression of message contents.

30. A message switching apparatus according to claim 1 in which the receiver's information terminal is a computer.

31. A message switching apparatus according to claim 1 in which one message processing procedure corresponding to each motive-procedure set stored in the motive-procedure set storing means denotes the forwarding of a message, a notification of a message, the deletion of a message.

32. A message switching apparatus according to claim 1 in which one message processing procedure corresponding to each motive-procedure set stored in the motive-procedure set storing means denotes a notification of a message.

33. A message switching apparatus according to claim 1 in which one message processing procedure corresponding to each motive-procedure set stored in the motive-procedure set storing means denotes the deletion of a message.

34. A message switching apparatus according to claim 1 in which one message processing procedure corresponding to each motive-procedure set stored in the motive-procedure set storing means denotes the preparation of a duplicated message.

35. A message switching apparatus according to claim 1 in which one message processing procedure corresponding to each motive-procedure set stored in the motive-procedure set storing means denotes editing of message contents.

36. A message switching apparatus according to claim 35 in which one message processing procedure corresponding to each motive-procedure set stored in the motive-procedure set storing means denotes the preparation of an abstract of message contents.

37. A message switching apparatus according to claim 1 in which one message processing procedure corresponding to each motive-procedure set stored in the motive-procedure set storing means denotes the translation of a message to another language.

38. A message switching apparatus according to claim 1 in which one message processing procedure corresponding to each motive-procedure set stored in the motive-procedure set storing means denotes the conversion of a message type.

39. A message switching apparatus according to claim 38 in which one message processing procedure corresponding to each motive-procedure set stored in the motive-procedure set storing means denotes the conversion of an internet electronic mail type to a different mail type.

40. A message switching apparatus according to claim 1 in which one motive corresponding to each motive-procedure set stored in the motive-procedure set storing means is expressed by a change of circumstances of the message switching apparatus.

41. A message switching apparatus according to claim 1 in which one motive corresponding to each motive-procedure set stored in the motive-procedure set storing means is expressed by a direct instruction to the message switching apparatus.

42. A message switching apparatus according to claim 1 in which one condition corresponding to each motive-procedure set stored in the motive-procedure set storing means is a condition peculiar to the message switching apparatus.

43. A message switching apparatus according to claim 42 in which one condition corresponding to each motive-procedure set stored in the motive-procedure set storing means is a test condition for the message switching apparatus.

44. A flexible and customizable message switching apparatus, comprising:
   motive-procedure set storing means for storing a plurality of motive-procedure sets, each motive-procedure set being composed of a motive and a message processing procedure with a condition,
   wherein the motive is adapted to detect:
      an event occurring in association with message switching,
      an occurrence of the event firing the motive,
      the message processing procedure with a condition comprising both a message processing procedure to be performed on a message and a condition allowing the message processing procedure to be performed if the message satisfies the condition, and
   wherein the contents of the motive, the condition, and the message processing procedure are set independently from each other so as to arbitrarily combine the contents among the motive, the condition, and the message processing procedure;
   message receiving means for receiving a particular message and a destination address of the particular message from a sender's communication terminal or information terminal;
   motive firing judging means for judging whether a particular motive corresponding to the particular message has been fired or not using the plurality of sets of motives and procedures;
   condition judging means for judging whether a condition of a particular message processing procedure included in the particular message has been satisfied or not by the particular message, in cases where the motive firing judging means judges that the particular motive has been fired; and
   message processing procedure performing means for automatically performing the particular message processing procedure in cases where the condition judging means judges that the condition of the particular message processing procedure has been satisfied.

45. A message switching apparatus of claim 44, further comprising transmitting means for transmitting a particular message to a receiver's communication terminal or information terminal indicated by the destination address in cases where the particular message processing performed by the message processing procedure performing means calls for transmission of the particular message to the receiver's communication terminal or information terminal.

46. A message switching apparatus of claim 44, further comprising editing means for allowing a user to edit the plural sets of motives and procedures, through a graphical user interface, from a table of previously listed motives, a table of previously listed message processing procedures, and a table of previously listed conditions.

* * * * *

UNITED STATES PATENT AND TRADEMARK OFFICE
CERTIFICATE OF CORRECTION

PATENT NO.    : 6,430,272 B1   Page 1 of 1
DATED         : April 30, 1998
INVENTOR(S)   : Tomoaki Maruyama It is certified that error appears in the above-identified patent and that said Letters Patent is hereby corrected as shown below:

<u>Column 35,</u>
Line 21, please insert -- , -- after string.

<u>Column 40,</u>
Line 59, please insert:
-- 47. A message switching apparatus, comprising:
a storing unit configured to store information in relation to a motive, a condition, and a message processing procedure so as to arbitrarily combine the contents among the motive, the condition, and the message processing procedure,
wherein:
the motive is adapted to detect an event occurring in association with the message switching and fired by an occurrence of the event,
the condition allows the message processing procedure to be preformed if the message satisfies the condition,
the message processing procedure is performed on a message if the condition is satisfied by the message, and
contents of the motive, the condition, and the message processing procedure being set independently from each other,
a message receiving unit configured to do receive the message from outside the message switching apparatus;
a judging unit configured to judge whether the motive is fired or not using the stored information in relation to the motive; and
a unit configured to judge whether the condition is satisfied by the received message in cases where it is judged that the motive has been fired and to perform the message processing procedure in cases where it is determined that the condition has been satisfied by the received message.--

Signed and Sealed this

Twenty-eighth Day of October, 2003

JAMES E. ROGAN
*Director of the United States Patent and Trademark Office*